(12) United States Patent
Johnson

(10) Patent No.: US 7,096,194 B2
(45) Date of Patent: Aug. 22, 2006

(54) DYNAMIC DETERMINATION OF OWNERSHIP INTEREST BASED ON CONTRIBUTION

(76) Inventor: Blake Johnson, 943 Casanueva Pl., Stanford, CA (US) 94305

( * ) Notice: Subject to any disclaimer, the term of this patent is extended or adjusted under 35 U.S.C. 154(b) by 732 days.

(21) Appl. No.: 09/835,209

(22) Filed: Apr. 13, 2001

(65) Prior Publication Data

US 2001/0039500 A1 Nov. 8, 2001

Related U.S. Application Data

(60) Provisional application No. 60/197,874, filed on Apr. 13, 2000.

(51) Int. Cl.
*G06Q 40/00* (2006.01)

(52) U.S. Cl. .......................................... 705/35; 705/37
(58) Field of Classification Search ................... 705/35, 705/37

See application file for complete search history.

(56) References Cited

U.S. PATENT DOCUMENTS

| 5,285,383 | A  * | 2/1994 | Lindsey et al. ............... 705/26 |
| 6,338,047 | B1 * | 1/2002 | Wallman ...................... 705/36 |
| 2002/0019796 | A1 * | 2/2002 | LeGraw ....................... 705/37 |
| 2002/0032626 | A1 * | 3/2002 | DeWolf et al. ............... 705/35 |
| 2002/0091611 | A1 * | 7/2002 | Minton ........................ 705/37 |

* cited by examiner

*Primary Examiner*—Alain L. Bashore
(74) *Attorney, Agent, or Firm*—Heller Ehrman LLP

(57) ABSTRACT

A technique is provided for determining ownership interest allocation for a business, wherein transactions of contributors with the business are grouped into contributor transaction classes (CTCs), and a contribution value is calculated for the contributor transactions in each CTC to indicate the contribution of each transaction to the value of the business, using one or more performance metrics for each CTC, and lastly, at least one ownership interest award rule for a contributor is determined, based on the calculated contribution values for the CTCs. The technique can be performed with a digital computer and can provide real-time dynamic measures of ownership interest allocation.

15 Claims, 19 Drawing Sheets

DYNAMIC DETERMINATION OF OWNERSHIP INTEREST BASED ON CONTRIBUTION

REFERENCE TO PRIORITY DOCUMENT

This application claims the benefit of U.S. Provisional Application No. 60/197,874, filed on Apr. 13, 2000.

BACKGROUND OF THE INVENTION

1. Field of the Invention

This invention relates generally to business determinations of ownership interest allocation and, more particularly, to methods and systems for determining equity structures of businesses.

2. Description of the Related Art

Businesses may be formed and may operate as corporations. The corporation issues shares of stock, which thereafter may be independently bought and sold. Often, the shares of stock in some corporations may be widely held by various funds, individuals, and even other corporations. The purchase of all the shares of stock in a corporation is one means of buying, or taking over, a corporation. Thus, the price of a share of corporate stock may fluctuate over the life of a corporation. More recently, awards of corporate shares (and options to purchase corporate stock) have been widely used as an inducement for executive recruitment, and stock option plans for employees generally have become highly competitive and, often, quite lucrative. As the share price of many corporations soars, interest in owning shares in those corporations has dramatically increased among businesses and the general public.

There may be many circumstances under which it would be advantageous to determine an allocation of an ownership interest, such as corporate stock, to be granted, sold, or traded. For example, it may be important for a corporation to develop a strategy for allocating stock among key executives and employees as part of stock options plans, for improved recruitment, greater employee morale, and increased employee retention. It would be advantageous to determine how to allocate stock in one corporation to another, as part of a corporate acquisition. Finally, it may be desirable to reward corporate customers (either businesses or individuals) with shares of corporate stock, particularly for the customers having the greatest impact on a corporation's business. For example, stock equity in a corporation may be granted to those customers with the largest purchases of corporate products. These various parties or groups to be allocated shares of stock may be viewed as entities competing for equity allocation.

Many allocations of corporate equity or other ownership interest occur on an ad hoc basis, in response to market forces and common industry practices. This makes creating and managing employee stock option plans difficult. Customer award plans also are made more difficult to implement. In addition, corporate mergers, acquisitions, and reorganizations are made less precise, consistent, and accurate. It would be advantageous to employ a systematic assessment of equity allocation among competing entities, to ensure consistent application of criteria and accurately determine the amount of stock to be awarded.

From the discussion above, it should be apparent that there is a need for systematically determining an allocation of ownership interest for a business, based on contributions to the furtherance of the business. The present invention fulfills this need.

SUMMARY OF THE INVENTION

The present invention provides a technique for allocating ownership interest for a business, wherein transactions of contributors to the business are grouped into contributor transaction classes, and a contribution value is calculated for the transactions in each class to indicate the contribution of each transaction to the value of the business, using a predetermined performance metric for each transaction class, and lastly, at least one award rule for a class member is determined, based on the calculated contribution values for all the transaction classes. The transaction classes, contribution values, and award rules may be adjusted to account for changing circumstances. In this way, the present invention provides a systematic method of allocating ownership interest among competing entities, based on business contribution, thus ensuring consistent application of criteria and accurate determination of the amount of ownership interest to be awarded.

The "contributors" to the business, to whom ownership interest will be awarded, may comprise any entities whose contribution to the business may be determined, such as customers of the business, and also including employees, executives and officers, and suppliers. The classes into which the contributor transactions are grouped will be referred to by the abbreviation "CTC". The "ownership interest" may comprise equity shares of a corporation, or warrants, stock options, partnership share interests, and any other quantifiable ownership interest. For convenience, these types of ownership interest may be generally referred to herein as "equity interests". The "business" may comprise a stock-issuing corporation or may comprise a newly formed corporation whose assets are based, in part, on an existing business having dealings with the "contributors", such as customers.

In accordance with the invention, information concerning the various CTCs is collected and one or more performance metrics for the contributors in each CTC is specified to determine the contribution of each to the business for which corporate shares or other ownership interests are being allocated. Finally, the award rules are specified, to determine the share allocation to be granted. These operations may be carried out with the assistance of a digital computer, if desired. The digital computer may be provided with real-time updates of contributor transaction data and operational rules, and may thereby provide real-time, dynamic measures of corporate equity allocation.

Other features and advantages of the present invention should be apparent from the following description of the preferred embodiment, which illustrates, by way of example, the principles of the invention.

DETAILED DESCRIPTION

Figure 1:
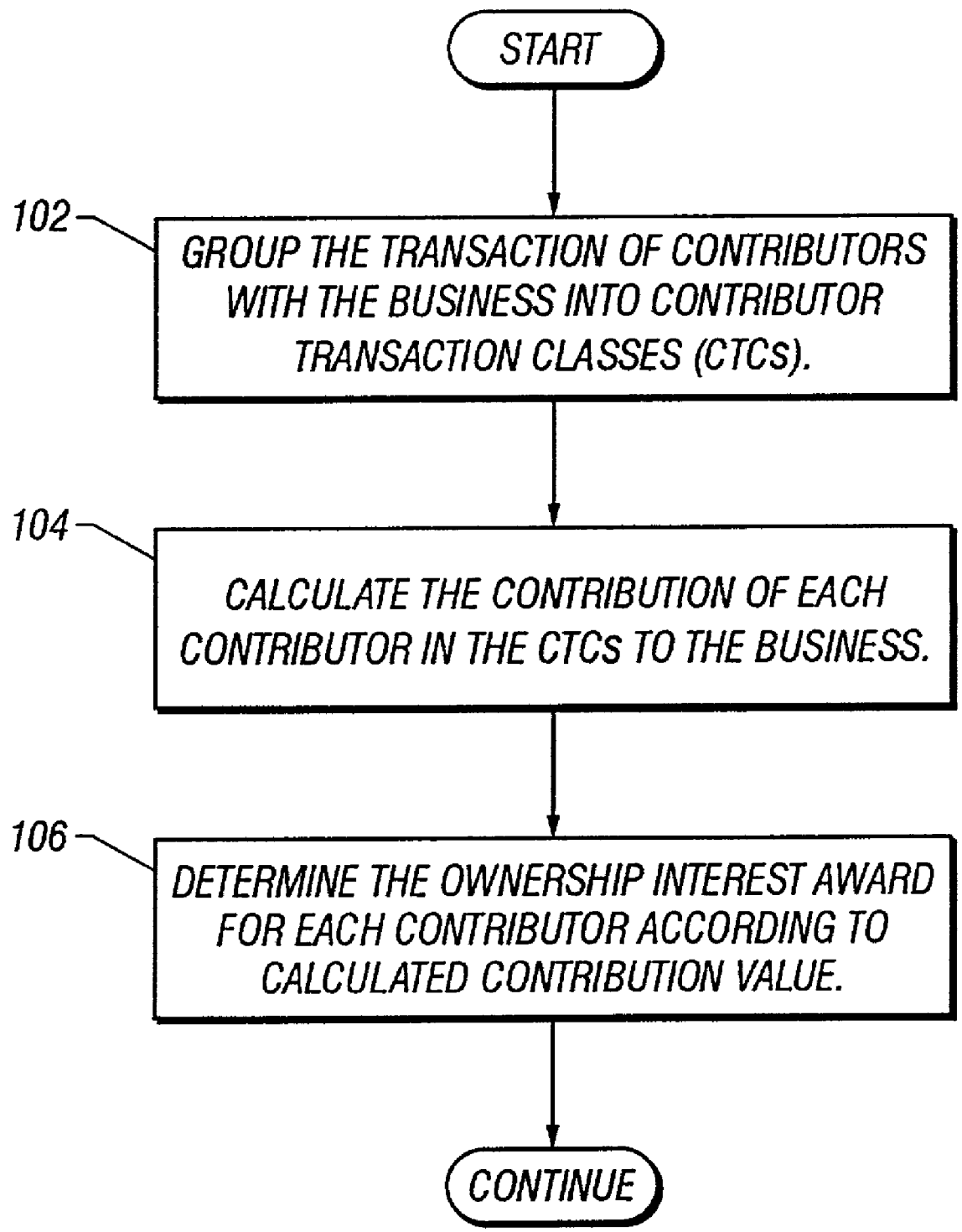
FIG. 1 is a flow diagram of a method for allocating ownership interest in a corporation in accordance with the present invention.

FIG. 1 is a flow diagram of a method for allocating ownership interest based on contributions to a business entity or enterprise, in accordance with the present invention. In the first operation of the method, transactions with the business entity are grouped into transaction classes of contributors. The "contributors" will be awarded ownership interest based on their contribution to the business. The contributors may comprise, for example, customers of the business, and they also may comprise other entities whose contribution to the business may be accurately determined, including employees, executives and officers, suppliers, and other business partners. References to "CTC" will be understood to be references to the contributor transaction classes. The performance of this class grouping operation is represented by the flow diagram box numbered 102. The specification of the CTCs is described in greater detail below.

Next, as represented by the flow diagram box numbered 104, a contribution value for the grouped contributor transactions in each CTC is calculated, to indicate the contribution of each transaction to the value of the business entity. The calculation is performed using a predetermined performance metric for each contributor transaction class, which is described below, in greater detail. The next operation in the method is to determine at least one award rule for a contributor or other contributor in response to the calculated contribution values for the CTCs. This operation is represented by the FIG. 1 flow diagram box numbered 106, and is described further below. The ownership interest, such as equity (shares of stock), may then be awarded.

The ownership interest may comprise shares in the business entity, if it is a corporation, or may comprise shares in a corporation being newly formed, based in whole or in part on assets of the business entity, or may comprise warrants, stock options, partnership shares, and the like. There may be ownership classes to be allocated, for example, ownership classes such as preferred stock and common stock, or general partner and limited partner. Thus, the technique provides a business method of systematically assessing equity allocation among competing entities to ensure consistent application of criteria and accurate determination of the amount of stock to be awarded, based on business contribution.

To determine the CTCs, the classes into which transactions of contributors will be placed, a technique in accordance with the preferred embodiment of the present invention evaluates the contributions of contributor transactions to the business for which ownership interests are being allocated. The CTC-specifying operations are illustrated in FIG. 2.

Figure 2:
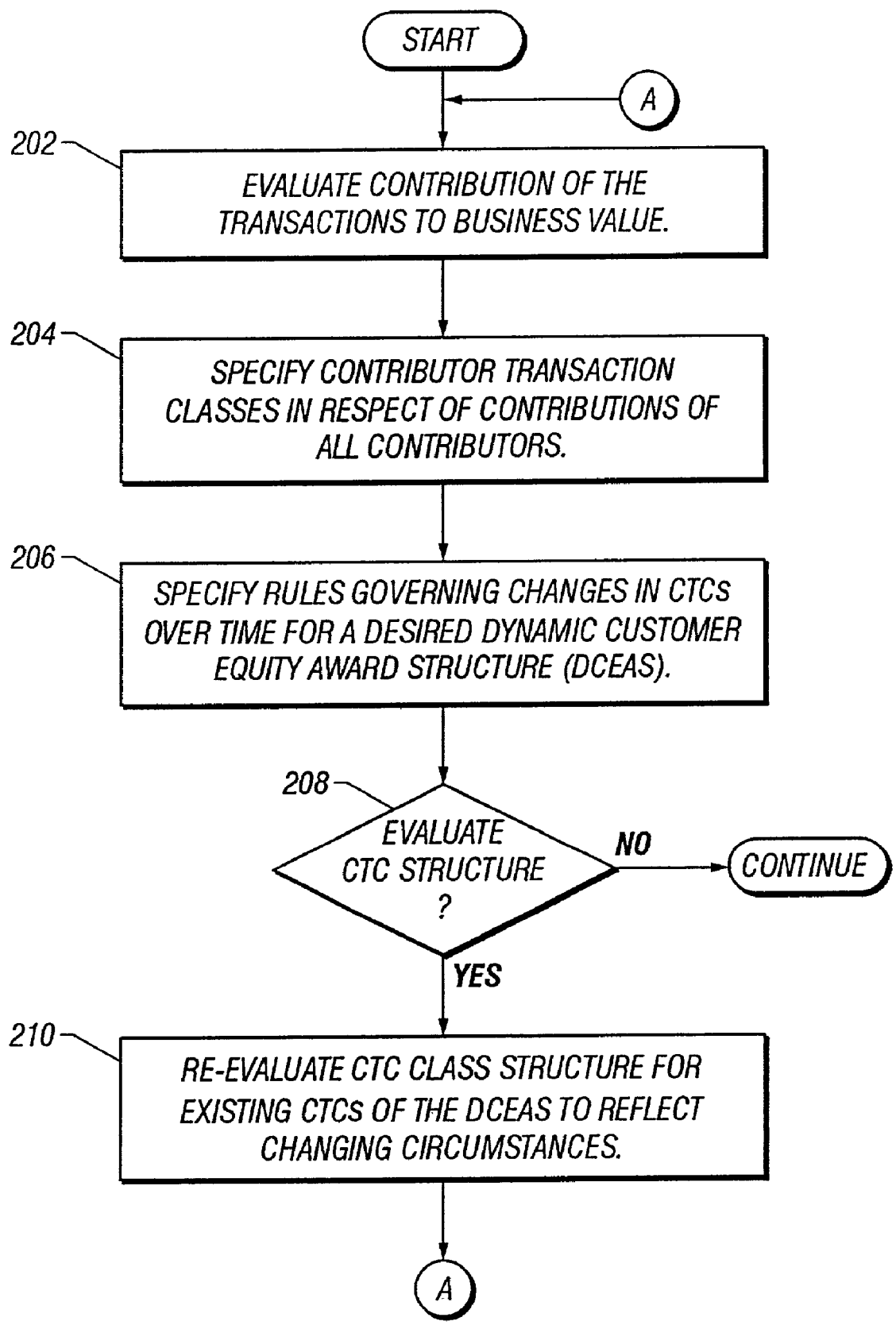
FIG. 2 is a flow diagram of specifying contributor transaction classes for the method illustrated in FIG. 1.

FIG. 2 shows that the first CTC-specifying operation is to evaluate the contribution of transactions to the value of the business. This operation is represented by the flow diagram box numbered 202, and will involve evaluation of the component of business value that is affected, including whether such component relates to the establishment of a new business, the enhancement or expansion (enlargement) of an existing business, and the maintenance of an on-going business. The value of such components may depend on the particular business for which awards are contemplated, and also may vary with the size of the business and with the maturity of the business and industry (e.g., older, established business or industry, or a new, growing business or industry). In addition to specification of affected value, this operation 202 also includes evaluation of the contributor transaction type, such as the product or service purchased, the contributor type, and the contributor relationship type. This part of the operation recognizes that some products, services, contributors, and relationships may be more valuable to the business than others.

Next, as indicated by the flow diagram box numbered 204, the CTCs are specified in terms of their contribution to the business value. This operation involves the evaluation of the significance of differences between the contribution made by different transaction types to the value of the business, and also involves determining the set of CTCs that will balance the complexity of the award plan with the accuracy of the award process. This balancing between complexity and accuracy will depend on the specific requirements and resources of the business. In this description, the ownership interest award plan may also be referred to as the Dynamic Contributor Equity Award Structure (DCEAS).

In the next operation, indicated by the FIG. 2 flow diagram box numbered 206, the rules governing changes in the CTCs over time are specified. Such changes may be implemented to reflect changes in circumstances and in market forces. For system administrative purposes, it is important to limit the persons who may implement changes, and therefore this operation 206 includes the specification of control rights and restrictions on who may make changes in the CTCs of the DCEAS.

After the CTCs and the rules for making CTC changes have been specified, it may be desirable to periodically re-evaluate the CTC. This operation is represented by the decision box numbered 208, and recognizes that it may be advisable to regularly review the CTC class structure, rather than wait for and respond to changes in market forces or business climate. If a time for regular, periodic re-evaluation of CTC class structure has not arrived, a negative ("NO") outcome at the decision box 208, the other award allocation operations continue. If it is time for a re-evaluation of CTC class structure, an affirmative ("YES") outcome at the decision box, then a re-evaluation process is performed, in which any changed circumstances are examined for impact on the DCEAS. Classes of contributor transactions may be changed, for example, or new classes may be added to the DCEAS. Any such changes will then be implemented (or propagated) in the CTC evaluation operations described above, as indicated by the connector "A" symbol and the return of operation to the flow diagram box numbered 202.

After the CTCs have been specified (FIG. 2), the next operation is to determine the contribution of each CTC transaction to the value of the business entity, using performance metrics. This operation sequence is illustrated by FIG. 3.

Figure 3:
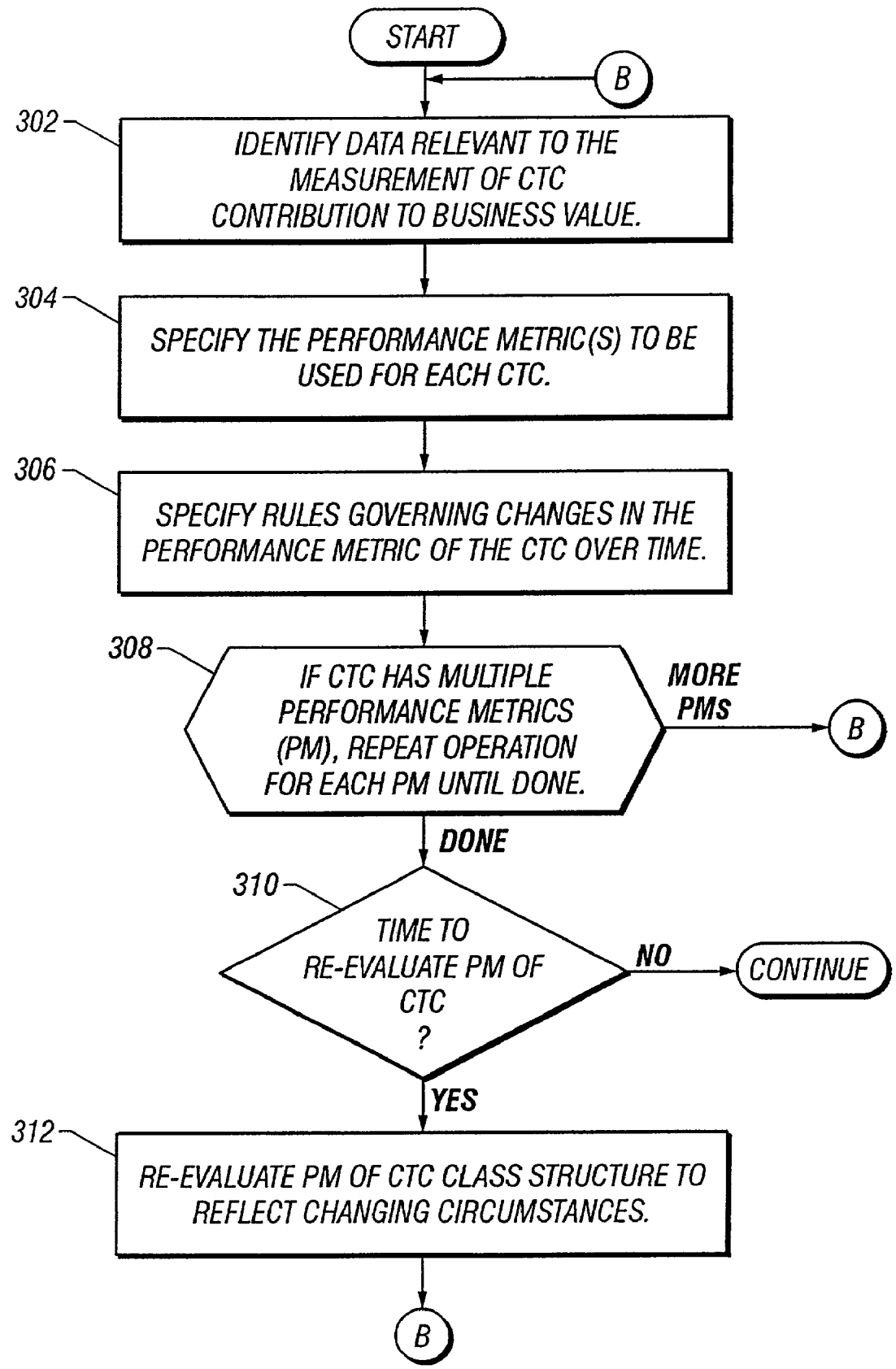
FIG. 3 is a flow diagram of specifying performance metrics for the method illustrated in FIG. 1.

FIG. 3 shows that the first step is to identify data relevant to the measurement of CTC contribution to the value of the business. Such data will relate to characteristics of the transactions and to circumstances affecting the value of the transactions. The transaction characteristics may include the products or services that are purchased, the contributor type and contributor relationship type, and the size of the transactions. The circumstances affecting the transaction value will typically include location of transaction, timing of transaction, total units sold, available capacity, market share of business, supply and demand conditions, and other circumstances that will depend on the business for which shares are being allocated and the time and resources available to develop the DCEAS. This operation sequence is represented by the flow diagram box numbered 302.

Once the data relevant to measuring CTC contribution have been determined, the next operation is to specify the performance metrics to be used for each CTC. This operation is represented by the FIG. 3 flow diagram box numbered 304, and includes specifying a performance metric (PM) in terms of the data relevant to the determined contribution to the business value. The PM specification may be conditional on circumstances affecting the transaction value, such as location, timing, units sold, and the like.

Next, as represented by the flow diagram box numbered 306, the rules governing changes in the PM of each CTC are specified. This operation recognizes that there must be a determination of rules governing changes in the PM rules of each CTC class, as changes in circumstances may occur that require adjustment to the PMs. It is important to control the persons who may make such adjustments. Therefore, the rules governing changes will involve specifying control rights and restrictions on changes in the PM of the CTCs. Some of the CTCs may include more than one PM. Therefore, it is necessary to repeat these rules operations for each PM. Thus, if there are more PMs for a given CTC, then operation is continued with the first rule operation (box 302) as indicated by the "B" connector of FIG. 3.

If the last PM for a CTC is completed, meaning that the rule processing is done, then PM rule processing continues at the decision box numbered 310. The decision box indicates that it may be desirable to periodically re-evaluate the PM rule operations. Therefore, the box 310 represents another operation in the PM rule processing for the re-evaluation of the PM rules. If a time for a regular, periodic re-evaluation of the PM rules has not arrived, a negative outcome at the decision box 310, then other PM processing operations continue. If it is time for a re-evaluation of PM rules, an affirmative outcome at the decision box 310, then a re-evaluation process is performed, in which any changed circumstances are examined to newly determine the PM for each CTC. This operation is indicated by the flow diagram box numbered 312. Any changes to the PM rules will then be implemented (or propagated) in the PM rule operations described above, as indicated by the connector "B" symbol and the return of operation to the flow diagram box numbered 302.

Figure 4:
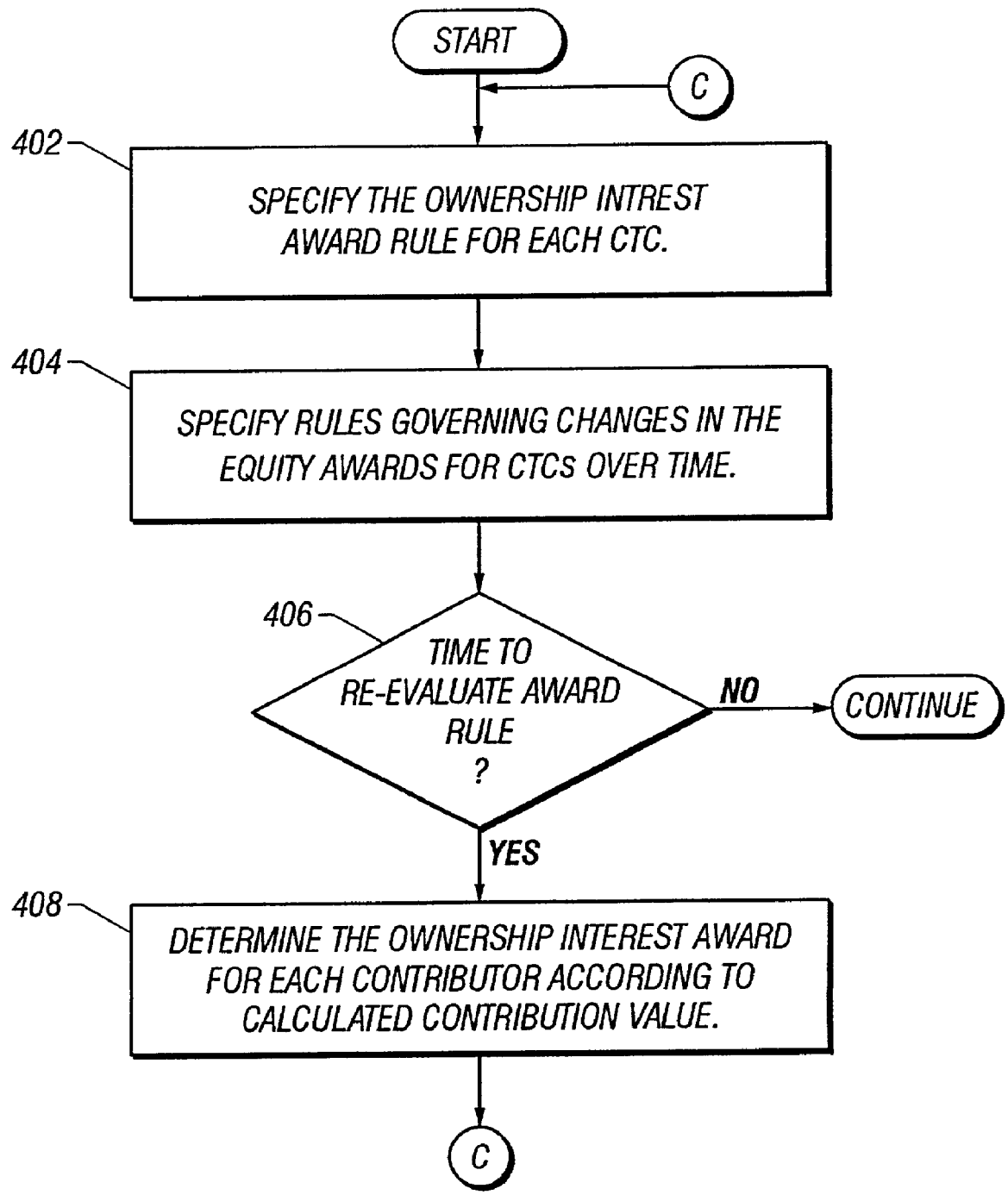
FIG. 4 is a flow diagram of specifying ownership interest award rules for the method illustrated in FIG. 1.

Determining the ownership interest award to be granted to a contributor (box 106 of FIG. 1) is further described with the flow diagram of FIG. 4.

FIG. 4 shows that the first operation is to specify the award rule for each CTC, as indicated by the flow diagram box numbered 402. Specification of ownership award will generally involve rules that involve considering the class size and rules that involve the class allocation. The class size rule determines the aggregate amount of the ownership interest to be awarded to a CTC on the basis of all the transactions contained within it. The class allocation rule defines the amount of the aggregate ownership interest that should be awarded to individual members of the transaction classes (CTCs), based on their relative contribution to the CTC. The designation of classes may depend on the aggregate performance metric of the CTC class or of some other variables, such as the volume of business or the profitability of the class members within the CTC, or the activity of the CTC members in one or more other CTCs. Any given member of a CTC could be awarded ownership interest based on membership in multiple CTCs, if such members carry on transactions that can be characterized across multiple CTCs.

Consideration of allocation procedures involves specification of ownership allocation within each ownership class over time. It should be noted that reallocation may be achieved through the issuance of new ownership interests in a class to individual contributors of the CTC, based on the relative contributions of the contributor to the CTC. That is, the business value of individual contributors of the CTC may be compared to the value contributed by other contributors in the CTC to allocate the class.

After the award rules for a CTC class have been determined, there must also be a determination of rules governing changes in the award rules of the class. This operation is represented by the flow diagram box numbered 404. It is important to control the persons who may make such determinations. Therefore, these rules will involve specifying control rights and restrictions on changes in the ownership class size and in the ownership class allocation rule.

After the ownership interest award rules and the rules for making changes to the rules have been specified, it may be desirable to periodically re-evaluate the operations. Therefore, another operation in the award method is represented by the decision box numbered 406, which asks whether it may be advisable to re-evaluate the award rule. If a time for a regular, periodic re-evaluation of the award rules has not arrived, a negative outcome at the decision box 406, then the existing award allocation operations continue. If it is time for a re-evaluation of award rules, an affirmative outcome at the decision box 406, then a re-evaluation process is performed, in which any changed circumstances are examined to newly determine the award rules. This operation is indicated by the flow diagram box numbered 408. The changes to award rules may include, for example, altering the ownership class size and the class allocation rules. Any such changes will then be implemented (or propagated) in the award rule operations described above, as indicated by the connector "C" symbol and the return of operation to the flow diagram box numbered 402.

The business operations described above for determining ownership interest allocations may be implemented with the aid of a digital computer. Thus, the data to be collected regarding customer transactions, business contributions, calculations, and the like described in connection with FIGS. 1, 2, 3, and 4, can all be collected and processed with the assistance of computers. If desired, multiple computers can be used, and the multiple computers may be networked together.

Figure 5:
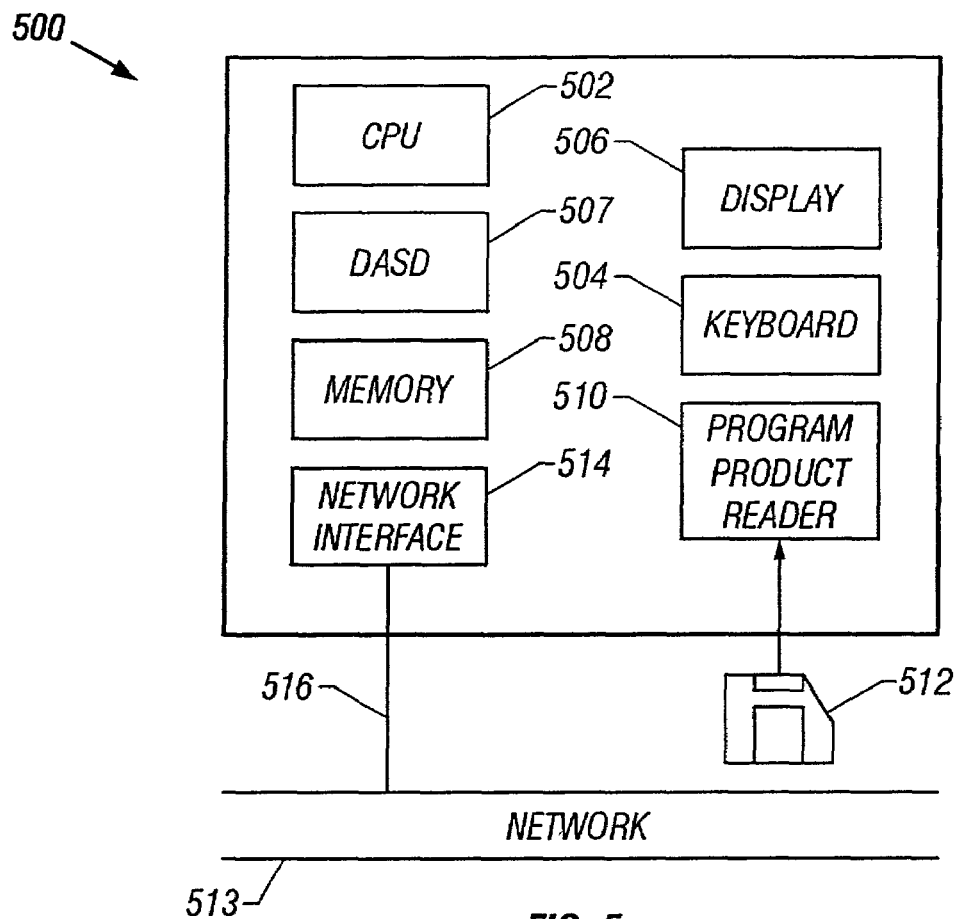
FIG. 5 is a block diagram that illustrates the construction of a computer that performs the method illustrated in FIG. 1.

FIG. 5 is a block diagram of an exemplary computer 500 on which the technique of the present invention may be performed. The illustrated computer 500 may be used to implement the processing of the operations described in conjunction with FIGS. 1, 2, 3, and 4 above. The computer 500 may comprise an independent, stand-alone computer, or may be connected to a computer network, as described further below. The computer 500 operates under control of a central processor unit (CPU) 502, such as a "Pentium" microprocessor and associated integrated circuit chips, available from Intel Corporation of Santa Clara, Calif., USA. A computer user can input commands and data from a keyboard 504 and can view inputs and computer output at a display 506. The display is typically a video monitor or flat panel display. The computer 500 also includes a direct access storage device (DASD) 507, such as a hard disk drive. The memory 508 typically comprises volatile semiconductor random access memory (RAM). Each computer preferably includes a program product reader 510 that accepts a program product storage device 512, from which the program product reader can read data (and to which it can optionally write data). The program product reader can comprise, for example, a disk drive, and the program product storage device can comprise removable recordable storage media such as a magnetic floppy disk, a CD-R disc, or a CD-RW disc. The computer 500 can communicate with other computers over a network 513 through a network interface 514 that enables communication over a connection 516 between the network and the computer.

The CPU 502 operates under control of programming steps that are temporarily stored in the memory 508 of the computer 500. When the programming steps are executed, the computer performs its functions. Thus, when the CPU executes the programming operations, the computer 500 implements the operations illustrated in FIG. 1, FIG. 2, FIG. 3, and FIG. 4. The programming steps can be received from the DASD 507, through the program product storage device 512, or through the network connection 516. The storage drive 510 can receive a program product 512, read programming steps recorded thereon, and transfer the programming steps into the memory 508 for execution by the CPU 502. As noted above, the program product storage device can comprise any one of multiple removable media having recorded computer-readable instructions, including recordable media such as magnetic floppy disks, CD-ROM, CD-R, and CD-RW storage discs, and DVD discs. Other suitable program product storage devices can include magnetic tape and semiconductor memory chips. In this way, the processing steps necessary for operation in accordance with the invention can be embodied on a program product.

Alternatively, the program steps can be received into the operating memory 508 over the network 513. In the network method, the computer receives data including program steps into the memory 508 through the network interface 514 after network communication has been established over the network connection 516 by well-known methods that will be understood by those skilled in the art without further explanation. The program steps are then executed by the CPU to implement the processing of the ownership interest award technique. It should be understood that the computer 500 can have an alternative construction from that illustrated and described above, so long as it can support the functionality described herein. The data needed to carry out the ownership interest award technique, such as transaction data and CTCs, may be received in the computer memory by a variety of means, including the above-described program product storage device and network communications techniques.

Figure 6:
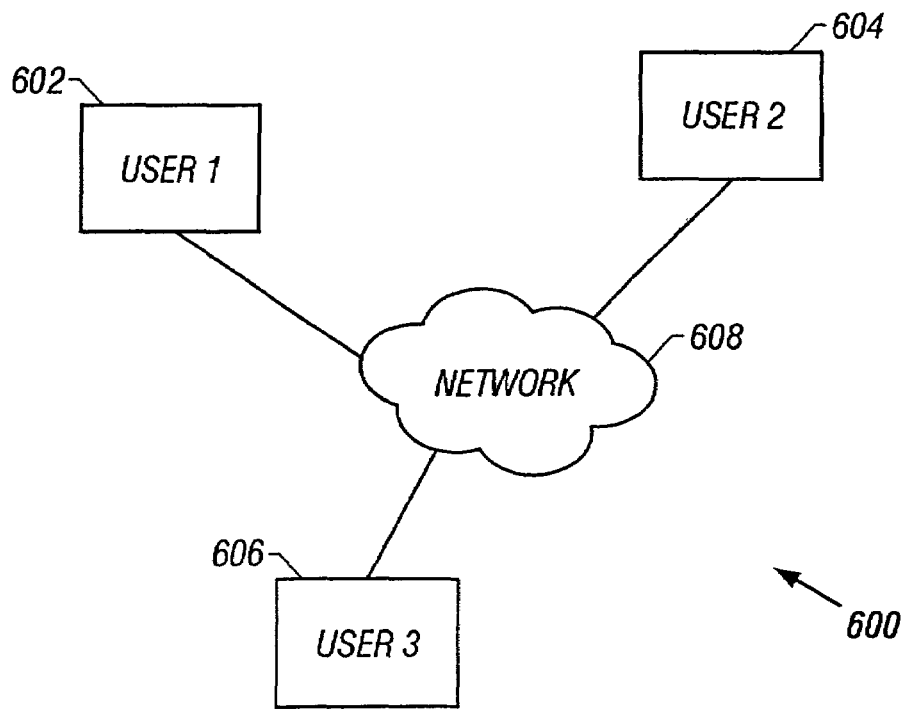
FIG. 6 is a block diagram that illustrates a computer network implementation of the present invention.

As noted above, the operations described above in connection with FIGS. 1, 2, 3, and 4 may be performed in a single computer, or may be distributed among multiple computers that communicate over a network. FIG. 6 is an example of a network 600 constructed in accordance with the present invention, such that three nodes of the network are illustrated, one for User 1 at 603, one for User 2 at 604, and one for User 3 at 606. The computers 602, 604, 606 communicate over a network 608, such as an intranet or the Internet. The computers collectively perform the operations illustrated above. Those skilled in the art will appreciate that the functionality and resources may be divided among the computers of a network. For example, one or more of the computers 602, 604, 606 may store the company and contributor data with which the system 600 will determine ownership interest to be awarded, whereas another computer may actually carry out operations to determine the awards, in accordance with the present invention. Thus, one or more of the computers 602, 604, 606 will receive a data set comprising business entity information, sales information, and the like, sufficient to determine contributor transaction classes, contributions of CTCs to the business entity, and award rules.

Various considerations and optional configurations will next be described for a computer system that determines business entity ownership interest to be awarded in accordance with the present invention.

DCEAS Technique

Described above is a Dynamic Contributor Equity Award Structures (DCEAS) technique that provides a rule-based system to dynamically allocate ownership of a firm to its contributors on the basis of their contribution to the value of the firm over time. The technique awards contributors a share of the value of the firm enabled by their business relationship with the firm. The award system dynamically adjusts the amount and type of the ownership of the firm that each contributor holds so that a match is maintained between the contributor's contribution to the firm's value at each point in time and its share of the ownership of the firm at that point in time.

The following description provides additional information that may be helpful in designing a computer system that implements the DCEAS features described above. Those skilled in the art will be able to implement these techniques, in view of this description, using well-known data processing considerations.

As described above, the rule-based system that provides a DCEAS is one in which: (1) contributor transactions with a firm are grouped into contributor transaction classes ("CTCs") according to a categorization by type of product or service purchased, contributor type, and the nature of the relationship between contributor and firm under which the transaction was completed; (2) the contributions that contributor transactions in each CTC so identified make to the firm's value are measured with a defined performance metric or set of performance metrics for that CTC; and (3) ownership of the firm is allocated to individual CTCs and among the contributors that conduct transactions in each CTC using defined equity award rules based in whole or in part on performance metrics of the CTC.

As a result of this technique, an equity sharing relationship between the firm and its contributors is defined by a transparent, rule-based system that enables the amount and type of ownership of the firm awarded to individual contributors over time to be dynamically matched to the relative contribution each such contributor makes to the value of the firm over time.

Like other structures under which firms share with their contributors a portion of the value they jointly create, the dynamic contributor equity award structure, or "DCEAS", encourages the joint creation of value by the firm and its contributors. Like other value sharing structures between firms and their contributors in which contributors receive value in the form of ownership in the firm, the value of the ownership that contributors are awarded varies over time with the relative success of the firm, encouraging contributors to work together with the firm to facilitate its success. Unlike other ownership-based compensation structures, the use of performance metrics and equity award rules based on a categorization of contributor transactions by product or service type, contributor type, and contributor relationship type allows the awards made to individual contributors to be dynamically determined easily, accurately, consistently and fairly and without the commitments, risk, and time consuming and often adversarial contributor by contributor negotiations of previous equity award structures.

The tailoring of the ownership awards provided by the DCEAS further allows the amount, dilution rate, control rights, dividends and priority of the ownership awarded to contributors to be determined independently for each of the defined categories of products and services, contributor type, and contributor relationship type. This allows both the amount and the characteristics of the ownership awarded to individual contributors to be efficiently tailored and dynamically adjusted over time to match the specific characteristics of that contributor's contribution to the firm over time. By enabling the efficient dynamic tailoring of contributor awards to contributor contributions, the DCEAS allows the firm to provide its contributors with very tailored incentives to conduct the types of business that are most valuable to the firm.

Finally, unlike other ownership award structures, under the DCEAS described herein the amount and type of ownership awarded to individual contributors can be determined based on the contributor's contribution to the firm relative to that of the firm's other contributors. For example, the type and aggregate amount of ownership awarded to the set of contributors of a CTC can be scaled to match the magnitude of the actual overall contribution that CTC makes to the firm relative to the actual contribution made by the other CTCs of the DCEAS. This aggregate equity award for a CTC can then be allocated to the individual contributors of the CTC based on their actual, relative contribution to the CTC and firm. In contrast, under existing structures how ownership will be awarded to individual contributors must be specified in advance on the basis of forecasted values of the contributor's likely relative contribution to the value of the firm in the future.

In the remainder of this description the term "equity" will be used to refer generally to a broad range of forms that an ownership interest in a firm may take, including common or preferred stock in various types of corporate forms, such as C-corporations, S-corporations, limited liability, non-profit and cooperative corporations, warrants or options on such stocks, or partnership interests in firms organized as partnerships.

Primary Components of a DCEAS

A. Identification of the Contributor Transaction Classes of the Structure

A DCEAS in accordance with the invention identifies the categories of products or services, contributor types, and contributor relationship types, hereafter referred to as contributor transaction classes (CTC), on which the DCEAS is based. The nature and number of CTCs chosen is a flexible design parameter of the DCEAS. Generally, the appropriate selection of CTCs will reflect a trade-off between the perceived heterogeneity of the contribution of each of the prospective CTCs to the firm's value and the additional complexity associated with a greater diversity of CTCs. In particular, it may be viewed as important to create a specific additional CTC if the contribution to the value of the firm made by the type of contributor transaction in question is believed to require an equity award of unique size or unique characteristics, such as rate of dilution, control rights, or dividend or priority structure.

Sample product or service types include products in product line X or services offered by division Y. Sample contributor type categories include low, medium and high volume contributors and strategic partners. Sample business relationship types include spot purchases and long term contracts. Sample CTCs include purchases of products in product line X by strategic contributors under long term contracts, and purchases of services offered by division Y by contributors that purchase less than $100,000 of such services per year.

B. Defining the Performance Metric for Each CTC.

A performance metric is defined for Each CTC to be used to measure the characteristics of contributor transactions within that CTC viewed as relevant to estimating their contribution to the value of the firm.

Sample performance metrics include sales revenue, net margin times sales revenue, and number of units purchased. For each such performance metric it may also be relevant to record the time, location, units of the product sold to date, total revenue or profits of the firm that period, the firm's market share, or other variables relevant to the estimation of the value of specific transactions to the firm.

C. Define the Equity Award Rule for Each CTC

For each CTC, an equity award rule is defined, based on the performance metric for the CTC. The equity award rule for a CTC specifies both how the aggregate amount of equity to be awarded to the CTC over time will be determined, and how this aggregate equity award will be allocated among individual contributors that conduct business in the CTC over time. The equity award for a CTC also defines the basic characteristics of the equity to be awarded to the CTC, such as its control rights, dividends, and priority relative to the firm's other classes of securities.

These characteristics of the equity award rules of the CTCs of a DCEAS allow the amount and type of both the aggregate equity awards to specific CTCs and of the allocation of these aggregate awards made to the individual contributors within a CTC to be determined on a relative and dynamic basis over time. Specifically, individual contributors receive equity awards based on the magnitude of their contribution to each CTC relative to that of other contributors of that CTC. Similarly, the aggregate amount of equity awarded to specific CTCs may be specified relative to, or as a function of, the aggregate amount of equity awarded to one or more other CTCs, to the nature and volume of the firm's overall business, or to other relevant business conditions. Finally, the characteristics of the equity awarded for specific CTCs, including its rate of dilution, control rights, dividends, and priority relative to the firm's other classes of securities can also be tailored to the CTC.

The following two examples illustrate at a very general level how a DCEAS can be applied to two very different business activities. Following the examples, the three principal components of the DCEAS structure, which are contributor transaction classes, performance metrics, and equity award rules, are described in more detail, and more complete examples are presented.

EXAMPLE 1

Assume that firm A is a market-making firm that trades two types of goods, X and Y. Assume that the firm has defined two CTCs, one for trades of good X and the other for trades of good Y, and has chosen trading volume, which may be measured either by dollar volume or units traded, as its performance metric for each CTC. Sample equity award rules for each CTC may specify that the CTC will be allocated a defined percentage of the ownership of the firm, such as 10% (comprising the aggregate equity award for the CTC), and must also specify a procedure for allocating this aggregate amount of equity to the individual contributors of the CTC, for example based on the proportion of the total trading volume in the CTC which they contribute. Alternatively, the equity award rules for the two classes may specify a procedure for dynamically allocating a defined total percentage ownership of the firm, such as 20%, among the two CTCs based, for example, on the relative trading volumes in each CTC over time, as measured by their respective performance metrics. As a third alternative, the equity award rules for either or both CTCs may specify the size of the class as a dynamic function of the firm's overall scale, profitability, or other relevant variables.

EXAMPLE 2

Assume that firm B sells products that become more desirable to its contributors as they become more widely adopted. For example, it may offer products that include a technology that will become a standard if widely adopted, or a new fashion that may or may not become widely popular. To encourage the early adoption of its products, the firm has chosen to establish CTCs for each product at its launch, and has defined equity award rules designed to award early adopters of the products. For example, the equity award rules may allocate equity to individual contributors within each CTC based on both the number of units the contributor buys and when they buy them, measured either in time, by cumulative units sold prior to their purchase, or some combination of both measures. To encourage early adopters, the equity award rule may specify the amount of equity to be awarded as a declining function of the date or order of purchase. The equity award rule may also specify the aggregate amount of equity to be awarded to each CTC as a dynamic function of the product's relative contribution to the firm's overall value, as measured, for example, by the percentage of the firm's overall sales or profits which it represents at each point in time.

Definition of Contributor Transaction Classes

As described in the introductory section above, the contributor transaction classes of a DCEAS segment a firm's overall business activities into classes of contributor transactions that are believed to contribute to the value of the firm in ways that are sufficiently differentiated to require different equity award rules, under which equity with different characteristics, such as rate of dilution, control rights, dividends, and priority relative to the firm's other securities is awarded. In this section methods of assessing the contribution which different types of contributor transactions make to the value of the firm are first described, followed by methods for selecting the CTCs of a firm's DCEAS that most efficiently reflect these assessed relationships. Both descriptions highlight a key design trade-off for a DCEAS, which is the trade-off between the complexity of the DCEAS and the accuracy with which the contributor equity awards of the structure dynamically match the characteristics of contributor contributions to the firm's value to the characteristics of the equity which contributors are awarded over time.

Assessing the Relationship Between Contributor Transactions and the Value of the Firm To segment a firm's business activities into a set of CTCs, it is generally helpful to begin by considering how a firm's products or services, its classes of contributors, and the types of contributor relationships which it maintains with its contributors affect its value. To do so it is frequently useful to segment the firm's overall value into several basic components, such as the value of the initial establishment of its franchise, the value of maintaining this franchise and the firm's associated market position over time, and the value of expanding and enhancing the firm's franchise and market position over time.

Generally, a firm's initial contributors and product lines or activities enable the initial establishment of its franchise. The firm's franchise is then maintained through the on-going sale of similar and follow-on products or services, and may later be expanded or enhanced through the successful expansion of the scale or scope of its activities.

Using a simple framework of this kind it is possible to estimate both the magnitude and the duration of the contribution to the firm's value made by particular classes of contributor transactions. For example, the firm in example 2 above may wish to award the initial customers that help it to establish its franchise equity that has a duration linked to the duration of the value of the firm's franchise in an amount matched to the magnitude of the role which their support played in the firm's establishment. How the duration of the equity awarded to the individual CTCs of a DCEAS can be set will be described in the section on equity award rules below. Similarly, over the course of time, the firm may wish to award to the purchasers of the products it offers over time equity that has a duration linked to the length of time that these products play an important role in the firm's sales. In addition, the firm may also wish to award additional equity of a longer duration to purchasers of products or services that are either sufficiently successful to affect the firm's market position and franchise value, or which serve as the basis for a subsequent series of follow-on products that contribute to the maintenance of the firm's value over a significant period of time. In the former case, particularly successful products can be viewed as expanding or enhancing the firm's franchise value, which as noted above is likely to have significant duration. In the later case the product or service serves as a "platform" from which the firm receives value over the period during which it continues to offer products or services based on that platform.

As a specific example, it has been said that the Microsoft Corporation franchise was established primarily through the successful launch of the disk operating system "MS-DOS" (DOS). Following the launch of DOS, the Microsoft Corporation franchise was subsequently maintained through the on-going release of new, updated versions of the DOS operating system. Later the scope of Microsoft's activities and the associated value of its franchise was subsequently expanded and enhanced through the offering of complementary products and services, such as the spreadsheet program "Excel", the word processing system "Word", and the internet browser "Internet Explorer".

Microsoft has also offered new enhanced operating systems over time, such as "Windows" and "Windows NT". Whether these operating systems are most appropriately viewed as platform products that contribute to the maintenance of Microsoft's operating system-based franchise over an extended period of time or to expanding and enhancing its franchise through significant enhancements in the functionality, scope and market acceptance of its operating system may require a careful analysis. Based on the results of this analysis, the duration of the equity awarded would either be linked to that of Microsoft's franchise value or to the duration of the offering of the operating system in question.

Distinctions between different components of a firm's value are useful to the design of the CTC's of a DCEAS since they help to identify how specific activities of the firm influence the components of its value. This is the information a DCEAS seeks to capture in its choice of CTCs and their associated performance metrics and equity award rules.

For example, the analysis of the Microsoft example above suggests that the firm's initial DOS customers were the primary customer contributors to its franchise value. This suggests that a CTC for Microsoft's DOS customers should be formed, that the equity awarded to it should have a long duration to match the duration of the firm's franchise value, and that the performance metric and equity award rule for the CTC should award declining amounts of equity to the purchasers of DOS over time as the operating system and Microsoft itself became more established. Similarly, the analysis suggests that it may also be appropriate to establish CTCs for complementary follow-on products such as "Excel", "Word", "Internet Explorer", "Windows", and "Windows NT". To adequately reflect the fact that some of these products, such as "Windows" or "Internet Explorer", may contribute to the expansion and enhancement of Microsoft's franchise if sufficiently successful, at their launch it may be appropriate to establish a CTC to which equity with a duration linked to the duration of the Microsoft franchise is awarded if sales of the products exceed some threshold level of business significance.

As a second example, the market making firm in Example 1 above may choose to define a CTC in which equity with a long duration is awarded to the firm's initial contributors, and to define one or more CTCs in which equity with a shorter duration is awarded to contributors that provide the firm with trading volume on an on-going basis. Finally, the firm may also establish one of more CTCs in which equity with a substantial duration is awarded to contributors of successful new activities over time that significantly expand the scope of the firm's activities, such as the successful opening of trading of a third product type.

CTCs for Different Contributor Types and Contributor Relationship Types

In addition to the nature and timing of the product or service purchased from a firm, the value of a customer transaction to a firm may also be influenced by the type of customer completing the transaction and the type of relationship the customer maintains with the firm.

For example, high volume customers may be more valuable to the firm, perhaps because they require less sales or operational support from the firm per unit of business conducted, or because they provide the firm with a degree of certainty in its demand. Similarly, transactions by contributors that have strategic partnerships with the firm, or by contributors which through their stature and reputation provide valuable signaling benefits to the firm and other contributors and business partners, may be more valuable to the firm. As a third example, transactions completed under long term contracts with the firm may be more valuable to the firm due to the signaling and risk management benefits which such contracts provide.

To adequately reflect the differences in the contribution to the value of the firm made by different contributor and contributor relationship types of this kind, the firm may choose to establish distinct CTCs for one or more of these types for one or more of its product or service transaction classes. For example, the firm may establish a CTC for contributors that agree to long term contracts in order to award such contributors equity that has a longer duration than the equity awarded for the purchase of similar products or services on a short term basis. Similarly, the firm may establish a CTC for strategic partners in which either more equity is awarded per unit of business conducted or equity with a longer duration is awarded than for contributors that are not strategic partners.

The discussion above of the creation of CTCs tailored to particular contributor types or contributor relationship types provides a natural point at which to re-emphasize the overall importance of creating CTCs that enable the characteristics of the equity awarded to contributors over time to be more closely tailored to the characteristics of their contributions to the value of the firm over time. The primary benefit provided by closer tailoring of this kind is that it allows the firm to provide its contributors with more focused incentives to contribute the greatest possible value to the firm. To see this, note that by structuring a DCEAS to include CTCs that differentiate between two types of contributor transactions that contribute to the value of the firm in different ways, the firm is able to signal to its contributors in an economically actionable and therefore credible way the nature and extent of such differences. As a result, the firm can provide its contributors with appropriate incentives to complete transactions in the categories of contributor transactions that provide the firm with the greatest value.

For example, by structuring a DCEAS to include CTCs that differentiate between products or services that have a different impact on the value of the firm, the firm is able to provide its contributors with an incentive to purchase the products or services that are more valuable to the firm which it would not be able to offer if the CTC structure of the DCEAS did not differentiate between the products or services. Similarly, by structuring a DCEAS to include CTCs that differentiate between contributor or contributor relationship types that have a different impact on the value of the firm, the firm is able to provide contributors with an incentive to change the nature of their relationship with the firm to a form that is more valuable to the firm, such as high volume contributor or long term contract status.

The principal drawback associated with more finely tailoring the matching of contributor transactions to the value of the firm with the nature and magnitude of the equity awards customers receive through the creation of a greater number of CTCs is the greater complexity of the associated DCEAS structure. As a result, to determine the optimal DCEAS structure for a particular firm a trade-off must be made between greater accuracy and greater complexity. The flexibility provided by the DCEAS framework allows this balance to be struck at any level of accuracy desired.

Finally, the flexibility of the DCEAS allows the structure and composition of CTCs to be modified over time. For example, the types of contributor transactions included in a CTC may be modified over time to reflect changes in the firm's business or competitive environment, with a simple example being the launch or termination of particular products or services. As will be discussed in the sections on performance metrics and equity award rules below, the contributors of one or more CTCs may wish to impose restrictions on or have some form of control rights over the nature of the changes of this kind which may be made. In addition, new CTCs may be defined and added to a DCEAS over time. For example, a firm may wish to add new CTCs when it launches a new product line, enters a new market, or begins doing business under a new type of contributor relationship. While there is little reason for the contributors of the existing CTCs of a DCEAS to be concerned about the act of creating additional CTCs, as will be discussed in the section on equity award rules below they may wish to impose restrictions on or have some from of control rights over the amount and type of equity awarded to such CTCs.

Equity with Different Control Rights, Dividends, or Priority

In addition to creating CTCs to enable equity classes with different durations to be awarded, it may also be desirable to create CTCs to enable equity with different control rights, dividends, and priority relative to the firm's other securities to be awarded to contributors that complete different types of transactions. The desire to award equity with different characteristics of this kind provides a second rationale for creating distinct CTCs.

A firm may wish to award equity with different control rights to contributors that complete different types of transactions for a range of reasons. For example, the firm may wish to grant greater control rights to contributors who are strategic partners, or who maintain long term contracts with the firm. Similarly, it may wish to grant greater control rights to contributors that purchase products or services about which it strongly values contributor input. Alternatively, the firm may wish to offer few or no control rights for equity awarded to CTCs that are likely to include contributors that have mutually competing or conflicting interests, or interests that are competing or conflicting with those of the firm. For example, the equity awarded to the CTCs of Example 1 above may be structured to have few or no control rights since the contributors trading in the firm's market are likely to have mutually competing interests, and would also be likely to compromise the neutrality of the firm's market if able to exercise control over it.

A firm may wish to award equity with different dividends or priority structure to further refine the economic characteristics of the equity awarded to different CTCs. For example, equity awarded to CTCs that generate significant cashflow and earnings for the firm may be structured to have substantial dividends, while equity awarded to CTCs that generate little current income but are expected to contribute to the firm's value over the longer term may be structured with few or no dividends, and as a result to provide most of their value through long term capital appreciation. Similarly, equity with shorter duration, which by its nature offers less opportunity for capital appreciation over time, may be structured with larger dividends in order to provide its holders with greater participation in the firm's earnings over its limited duration.

The firm may award equity with different priority in order to more closely match the risk profile of the equity awarded to a CTC to the risk assumed by the contributors who comprise it, or to partially compensate for differences in control rights across CTCs. For example, the firm may award equity with higher priority to the firm's cashflow and liquidation value to CTCs of its strategic partners, high volume customers, or long term contract holders, since by virtue of their greater commitment to the firm these contributors assume more risk than the firm's short term or occasional customers. Similarly, the firm may offer higher priority to equity classes with few or no control rights to partially compensate for the more passive role which such classes play in the determination of the firm's policies and its resulting level of success.

To summarize, the distinctions of franchise establishment, maintenance, and expansion and enhancement provide useful general categories of firm value. These distinctions can be used to evaluate the impact that specific categories of products and services, contributors of specific types, and contributors with specific relationship types have on the value of the firm. This can in turn be used as the basis by which to select the CTCs of a DCEAS, which should be chosen to differentiate between contributor transaction types that have substantively different impacts on the firm's value, or for which differences in control rights, dividends, or priority are viewed as appropriate. While the DCEAS framework allows an arbitrary number of CTCs to be chosen, and as result an arbitrary level of accuracy to be achieved in the resulting match between the characteristics of each contributor's contribution to the value of the firm and the characteristics of the equity in the firm which that contributor is awarded over time, in practice a trade-off must be made between the complexity of the DCEAS and the accuracy of the matching which it provides.

Performance Metrics

In addition to the simple trading volume and product sales revenue performance metrics used in the examples above, a wide range of alternative performance metrics may also be used in a DCEAS. Examples include alternative financial performance measures, such as those related to the profitability of particular types of contributor transactions, or to the assets or other resources required to complete particular types of contributor transactions. Other examples include performance metrics based on the number of units a customer buys, such as number of software licenses purchased.

Performance metrics can be further refined by defining them to incorporate the time at which specific products or services are purchased, such as early or late in the product's lifecycle, or during the high or low demand or availability period for the product or service, or on other conditions relevant to the value of the sale of the product or service to the firm, such as its geographic location, whether or not it has sold well to date, and the firm's inventory position in the product. The firm may also wish to design its performance metrics for particular products of services to respond to the actions of its competitors, such as new product introductions or promotions, since by doing so it can encourage its contributors to better respond to those actions. To capture effects of this kind, the relevant performance metric must include the necessary additional variables, such as the time or location of a sale, a product's current availability, or the current market share of the firm.

Multiple Performance Metrics for a Single CTC

Since the equity awarded in different CTC equity classes is only distinguished by its duration, control rights, dividend and priority structure, the firm may also choose to combine in a single CTC several types of customer transactions for which the award of equity with the same set of these characteristics is believed to be appropriate. If this is done, multiple performance metrics can be used to measure the contributions to the CTC made by each of the range of contributor transaction types it includes.

For example, the firm may choose to employ multiple performance metrics to measure the contribution made by the sale of each of a range of related products or services, of the same products or services in several different geographic regions, or of the products or services that it is better able to supply over time, perhaps due to seasonal trends in availability or demand, or due to the availability of appropriate production capacity. A firm may also choose to use a single CTC with multiple performance metrics for different contributor types or contributor relationship types for which the award of equity with the same characteristics is viewed as appropriate. For example, the firm may choose to select different performance metrics for contributor transactions based on contributor size or other measures of contributor value to the firm, such as their status or reputation, the type of relationship they maintain with the firm (such as strategic partner or occasional business partner) or their geographic location.

The use of multiple performance metric structures within a single CTC can be used to provide tailored incentives that encourage contributors to purchase particular types of products, to increase the scale of their business with the firm, or to form particular types of relationships with the firm, such as strategic partnerships. When this is done, as a contributor's status changes, or the type of business it does with the firm changes, the performance metric that applies to it will change, rather than the CTC equity class in which it is awarded equity.

As an example, the firm may wish to provide contributors with incentives to make commitments to provide the firm with particular types or volumes of business in future periods. To do so, it may choose a performance metric that assigns incremental credit to such contributors at the time they make their commitments, or over time as they honor the commitments. In either case, the performance metric may either be defined in terms of the performance metric that would have applied if the business had been conducted on a "spot" or "uncommitted" as opposed to pre-committed basis, or may be defined separately. For example, in exchange for a contributor's commitment, the firm may offer a premium to the compensation the contributor would have received for its business over time had it conducted it without making a prior commitment. In addition, the amount of the premium for a commitment may vary based on its type, size, duration, or other relevant variables.

Figures 7, 8:
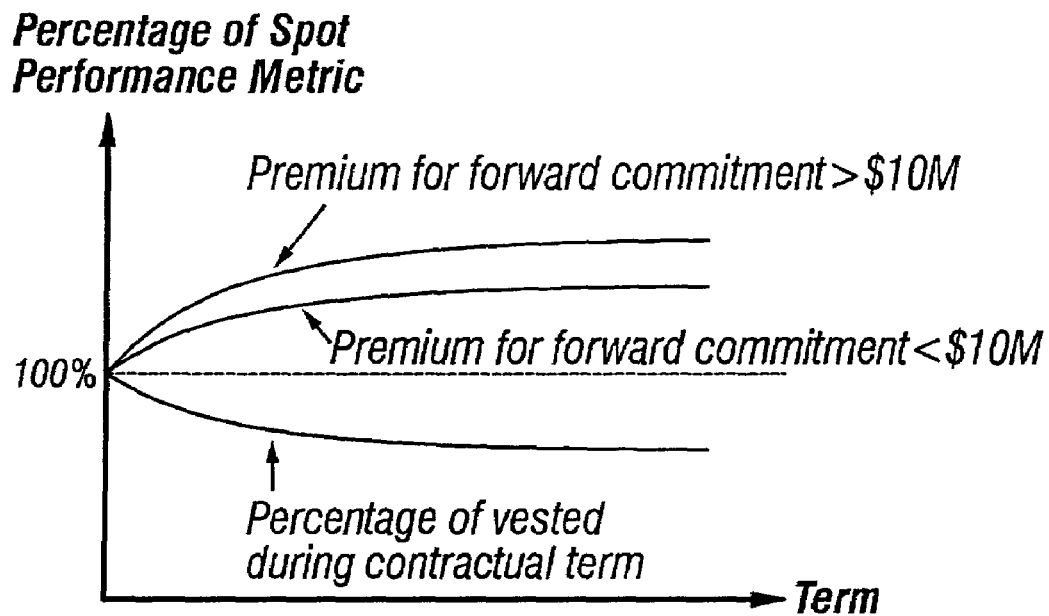
FIG. 7 is a graph that shows an example of a potential reward and penalty structure for future commitments, for use in connection with the system operation illustrated in FIGS. 1 through 4.
FIG. 8 is a graph that shows an initial, exemplary equity class size award rule for the system constructed in accordance with the invention.

To illustrate the implementation of a performance metric for a future commitment that is defined in terms of the "spot market" performance metric that would otherwise have applied at the future date and under the future conditions that the business is actually conducted, consider the following simple example. Assume that the performance metric in question offers a premium for future commitments that is defined as a mark-up over the "spot market" performance metric that would otherwise have applied. This mark-up may increase as the term of the commitment increases. For example, the premium may be 10% for a one year commitment and 20% for a two year commitment. The mark-up may also vary across the products or services in the relevant CTC, and may depend on the terms of the commitment, such as whether the future price of the product or service is specified or only bounded to a range. Finally, to protect against the risk that a contributor may fail to honor some or all of a commitment it makes, the performance metric or metrics for commitments may be structured to delay the award of some or all of the credit for the commitment until some or all of the commitment has been fulfilled. For example, the firm may choose to recognize only a fraction of the credit for the commitment over the course of the commitment, and to hold the remainder in reserve until the commitment is met in full. Alternatively, it may choose to partially or completely recognize the credit a contributor has earned for the portion of its commitment which it has honored to date at one or more intermediate points in the life of the commitment. An example of a potential reward and penalty structure for future commitments is shown in FIG. 7. In particular, FIG. 7 shows a performance metric for forward commitments of different terms and scale as a percentage of performance metric for "spot" or uncommitted transactions over time. "Vesting" schedule gives percentage of equity awarded during term of commitment, with remainder withheld until commitment is honored in full.

Restrictions on and Control Over Changes in Performance Metrics

In many cases it may be desirable to allow one or more of the performance metrics of a DCEAS to be changed or redefined over time to better reflect the evolution of relevant circumstances over time. The possibility that performance metrics may be changed over time naturally raises issues of how the metrics may be varied, and by whom. For example, when performance metrics can be varied over time, in order to plan their interactions with the firm, a firm's contributors are likely to wish to know when, how, and to what extent specific performance metrics may be varied. This is an important design issue for a DCEAS, since it addresses the trade-off between the desirability of allowing the structure to be modified over time to best match the circumstances that actually prevail over time and the desirability of providing both the firm and its contributors with advance knowledge of how contributor transactions will be measured under alternative possible circumstances.

To protect themselves against adverse changes in the performance metrics that may apply to them over time, a firm's contributors are likely to seek restrictions on the nature of the variations in the performance metrics allowed over time. Alternatively, they may seek some form of control over or veto rights on future performance metrics. Basic control rights over a key component of the CTC of a DCEAS such as its performance metrics may be viewed as appropriate even for CTCs for which the equity awarded carries few or no other control rights.

Equity Award Rules

The equity award rule for a CTC can be naturally divided into two components: the component that specifies how the size of the CTC equity class will be determined over time and the component that specifies how this aggregate amount of equity will be allocated among contributors who complete transactions in the CTC over time. Each of these components are described below.

A. Specification of CTC Equity Class Size

The size of the equity class for a CTC may defined in one of the two general ways. First, it may be specified absolutely, such as X % of the firm, or Y shares. Second, its size may be made conditional on the outcome of one or more uncertain future events, such as X % of the firm or X shares if event A happens and Y % of the firm or Y shares if event B happens. Each of these alternatives is discussed in more detail below.

B. Absolute Equity Class Size Award Rules

Absolute equity class size award rules specify the size of the equity class of a CTC over time as either a percentage of the firm or as a defined number of shares. The specified size may be a function of time, such as 10% during the first year and 20% thereafter. It may also be renegotiated over time subject to restrictions on and defined control rights over such changes similar in nature to the rules governing changes in CTC performance metrics described above. Under an absolute equity class size award rule the class size may not, however, be made dependent on the outcome of uncertain future events.

Absolute equity class size award rules have the benefit of being simple and certain, and as a result easy to understand. The fact that they do not depend on the outcome of uncertain future events may also make them appealing to at least some parties to the DCEAS. For example, this may be true under conditions of sufficiently high uncertainty that conditional equity award rules become difficult to effectively structure or to reach consensus on. In general, however, the rigidity of absolute equity class size award rules makes them less desirable than the conditional aggregate equity award rules described below, under which the size of the equity class of a CTC may be adjusted dynamically in response to the actual evolution of the uncertain future activities of the firm and of uncertain future business conditions.

C. Conditional Equity Class Size Award Rules

Conditional equity class size award rules specify the size of the equity class of a CTC over time as a function of one or more uncertain events. These events may include changes in the nature and volume of activity within the CTC, within some combination of the firm's CTCs, or within the firm as a whole, such as sales, profitability, cost structure, or rates of growth measured on either an absolute or relative basis. The size of the equity class of a CTC may also be made conditional on events in the firm's broader market environment, such as competitive conditions, or specific actions taken by its competitors, or other market conditions. For example, the award rule may increase or decrease the size of the equity class in response to changes in the firm's competitive position, as measured, for example, by its market share or by new product offerings by its competitors. Alternatively, the rule may be structured to match or exceed prices or other terms and conditions of doing business which its competitors may offer.

As an example, a firm in a competitive market may choose to make the size of the equity classes of one or more of its CTCs a function of its market share or other measures of its competitive position. In this case, in order to provide an incentive to its contributors to help it achieve a strong competitive position, and to share some of the benefits of such a position with them once attained, the firm may choose to make the size of one or more of the relevant equity classes an increasing function of its competitive position. Alternatively, the firm may choose to make the size of one or more of its equity classes a decreasing function of its competitive position to protect its contributors against the risk that its competitive position will deteriorate, as well as to encourage them to patronize the firm when its market position is weak.

As a second example of a conditional aggregate equity award rule, a firm that benefits from economies of scale in production may agree to make the size of the equity classes of one or more of its CTCs an increasing function of its scale. Doing so allows it to share, on a dynamically adjusting basis, the benefits of increases in its scale with the contributors that enable that increase. For similar reasons the rule also protects the firm in the event that its business fails to reach scale, as well as against the possibility of subsequent reductions in its scale.

Due to the extremely flexible and customizable nature of conditional equity class size award rules, a firm with multiple CTCs is likely to select a range of different equity class size award rules for its CTCs, with each tailored to the firm's goals for and the specific circumstances of the CTC in question. While any combination of variables associated with the firm's performance and its larger business environment may be used in such rules, as discussed next, in many cases the aggregate values of the performance metrics for the firm's CTCs may serve as particularly useful conditioning variables for these rules.

The Use of Aggregate Performance Metrics in Equity Class Size Award Rules

Because the performance metric or metrics for each CTC are designed to capture the most economically relevant aspects of the activity within that CTC, the aggregate values of these performance metrics frequently serve as useful conditioning variables for conditional aggregate equity award rules.

For example, in example 1 above the market making firm was assumed to have selected trading volume as the performance metric for each of its two CTCs. As a result, the aggregate value of the performance metric for each CTC will equal the aggregate trading volume of that CTC. This value may be useful for determining either the absolute or the relative size of each CTC, or both. For example, the firm may specify the combined size of the equity classes of its two CTCs to equal 20%, and determine the relative size of each class based on the proportion of the firm's aggregate trading volume which each comprises. For example, if during the first trading period product 1 represents 40% of the firm's total trading volume, the size of the CTC for product 1 may be set to 40% of 20%, or 8%. If during the second trading period trading of product 1 increases to 60% of the firm's total trading volume, the size of the CTC for product 1 may be increased to 60% of 20%, or 12%.

A range of other rules that specify the size of the equity class for each CTC as a function of the aggregate performance metric of that and possibly other CTCs may also be designed. For instance, in the example above, the firm may wish to determine the size of the equity class of each CTC based on a moving average of the trading volume in each CTC over time. Alternatively, the firm may wish to assign proportionally more equity per unit of trading volume to one CTC than the other, perhaps due to its greater profitability, growth potential, strategic value or other characteristics.

Finally, it may be desirable to define equity award rules based on both the aggregate performance metrics of one or more CTCs and on other relevant variables of the type discussed above. For example, the trading firm of example 1 may wish to determine the relative magnitude of the equity classes of its two CTCs based on the relative magnitude of their aggregate performance metrics. Then, to capture the effect of the firm's scale on its relative profitability, it may wish to determine the absolute magnitude of the two classes based on the firm's overall scale. As a second example, it may wish to determine the relative size of the equity classes of the two CTCs based on a combination of their aggregate performance metrics, their relative profitability, and the firm's relative competitive position in the respective trading markets for the two products.

Alternatively, the firm may wish to vary the size of the CTC equity classes in response to competitive dynamics or other factors that affect the relative value of each of the classes to the firm. For example, in an environment of increasing uncertainty, the firm may want to increase the size of the CTC equity classes for strategic and long term contributors in an attempt to attract more long term contributors, and thereby reduce its exposure to uncertain future business conditions.

As an another example of how variations in the size of the CTC class may be used to allow a dynamic equity allocation structure to adjust dynamically to changing business conditions or to changes or differences in the beliefs and desires of the firm and its contributors, the firm may choose to link the prices it charges, or other factors that affect the profitability and volume of its business, such as the type and range of products it offers, to the size of one or more CTC equity classes.

For example, the firm may offer to lower the prices it charges for particular products or services in exchange for a reduction in the size of the CTC equity class for the products or services. In this case customers of the CTC will clearly benefit from the reduction in prices, but will also receive a smaller share of the firm's earnings, which will themselves presumably be reduced by the price reduction. The firm's other shareholders will in contrast receive a larger share of the firm's earnings, but see the amount of those earnings decline. The contributors of the CTC and the firm's other shareholders may find such a change desirable if the preferences of the contributors of the CTC for price discounts versus equity awards changes over time relative to those of the firm's other shareholders. Alternatively, they may find the changes desirable if they have different views of the firm's earnings potential following the proposed reduction in its prices. A similar change could obviously be made in reverse, with the size of a CTC equity class increased in exchange for an increase in the prices or profit margins on its associated products or services. As a second example, the firm may agree to further customize the relevant product or service offerings, which presumably will increase the cost of the products or services, in exchange for a reduction in the size of the CTC equity class, or to reduce its product variety and customization in exchange for an increase in the size of the class.

Differences in Control Rights, Dividend or Priority Across Multiple CTC Equity Classes As discussed above, a second reason for creating multiple CTC equity classes in a DCEAS is to enable the award of equity with different control rights, dividends or priority to contributors based on their type, the types of products or services they purchase from the firm, or the type of relationship they maintain with the firm. For example, the firm may wish to give more control rights to contributors that enter into long-term relationships with it, or that conduct volumes of business with it that exceed one or more specified thresholds. Alternatively, the firm may grant different control rights to contributors that have a significant interest in or effect on how the firm's products or services are used. This may be true for contributors that use the firm's products or services as an input to other products or services, or that act as sales or distribution agents for the products or services. In either of these cases the contributor is likely to have both a strong interest in and valuable knowledge about how the firm's products or services are used by their end customers, and as a result to be capable of providing valuable input to the firm's management.

In contrast, the firm may choose to grant very limited control rights to classes of contributors likely to be viewed by other classes of contributors as at risk of attempting to influence the firm to their advantage. For example, this may be the case when the firm's contributors include contributors that compete strongly with each other, and which may as a result view the risk of influence or control over the firm by one or more competitors with concern.

As a final example, the firm may wish to award control rights over specific aspects of its business activities to contributors directly involved with those activities. For example, a firm with multiple distinct product lines may wish to give contributors of each of its individual product lines some control over decisions that affect that product line, but little or no control over decisions that affect other product lines. Alternatively, the firm may choose to award contributors in particular geographic regions control rights specific to its activities in that region.

The analysis above of the appropriate control rights to grant to the equity classes of the CTCs of a DCEAS serves as a natural place to highlight the unique ability of a DCEAS with properly structured control rights to enable interactions between and cooperative action among parties for which such actions may previously have been infeasible. This ability is an additional valuable consequence of the ability of a DCEAS to facilitate cooperative action to create shared value under circumstances in which this would previously have been infeasible due to the prohibitively large contracting and transactions costs of traditional ownership structures.

To illustrate this capability, consider the following example. Assume that a few large firms dominate the market for a particular product, and that these firms wish to establish a firm with a DCEAS to facilitate trade between them. Because of the market power of each of these large firms, and the value each is accordingly likely to place on information about the needs or actions of its competitors, under these circumstances leading firms are generally reluctant to trade with each other directly. Opportunities for mutually beneficial trades are as a consequence either lost, or are conducted through a neutral third party which, by virtue of the fact that it alone knows the needs of the parties to the trade may be able to extract much of the value generated by the trade. As a result, the leading firms in the market are either unable to complete beneficial trades or are unable to capture a significant portion of the benefit the trades generate.

This problem can be overcome if the leading firms in the market jointly establish or patronize a neutral intermediary firm with a DCEAS with one or more CTC equity classes whose ownership they will share, and which carry few or no voting rights. Due to its independent status, the leading firms in the market can rely on an intermediary market-making firm structured in this way to coordinate trades between them. In this respect the market-making firm is similar to neutral intermediary firms currently in existence. Because the firm is structured with a DCEAS, however, the firm differs from existing intermediary firms in two crucial ways.

First, because the firms for whom it facilitates trades own a share of the firm, they are able to recover a share of the gains from trade the firm extracts from them. Second, because the ownership of the CTC equity classes of the firm's DCEAS is dynamically allocated to individual contributors of the firm based on their actual relative contribution to the firm over time, each of the firm's contributors will own a fraction of the firm, and will thus recover a share of the gains from trades which the firm extracts proportional to their contribution to the value of the firm. Thus the structure both creates a neutral intermediary capable of facilitating trades between its contributor firms and ensures the contributor firms that trade through the firm will receive an appropriate share of the value it extracts from them over time in this intermediary role. The later feature, which is enabled by the DCEAS, creates a new form of organization that makes it possible for leading firms in concentrated markets to increase efficiency and improve coordination without affecting their competitive position or independent status.

Two other aspects of the structure above deserve note. First, a market-making firm that is owned in whole or in part by the leading firms in the market in which it operates will in general be viewed as anti-competitive if the leading firms have control rights over the firm. Thus in addition to ensuring the neutrality of the firm, the firm's independent status is essential to its legal status as a trading firm rather than as a vehicle for possible anti-competitive or collusive behavior. Second, the "arms length" nature of the relationship between each of the leading firms in the market and the market-making firm under the proposed DCEAS ensures that both the market firm and each of its contributor firms will have the incentive to search for and negotiate towards the best possible trades for their respective firms. This ensures the sort of active, informed competition among the firms likely to lead to the most efficient overall outcomes.

To see this in a simple example, assume that the market-making firm, Firm A, facilitates trades between two market leading firms, Firms B and C, which hold ownership in a CTC equity class in Firm A. If the trading Firm A and market leading Firm B have personnel expert in structuring and negotiating trades in the market in question while Firm C does not, it is likely that Firm C will capture less value from the trades it conducts than will Firms A and B. As a result, it will on average generate larger profits for Firm A than will Firm B. However, it will be allocated equity in Firm A according to the same equity award rule as Firm B. As a result, Firms A and B will benefit from Firm C's relative lack of trading ability. Over time this will encourage Firm C to strengthen its trading staff, thereby increasing the overall quality of the trades conducted. By doing so the DCEAS enables a highly competitive and efficient trading environment of the sort previously only possible in fragmented, highly competitive markets with many participants.

Restrictions on and Control Over Changes in Equity Class Size Award Rules

While in many cases it may be both possible and desirable to specify in advance how the size of a CTC equity class will vary in response to future events, in others this may be either difficult or undesirable. Under such circumstances changes in the size of the class may be negotiated in response to future events as they occur.

As discussed in the section above on the definition of the CTCs of a DCEAS and of performance metrics, when negotiated changes in one or more of the equity class size award rules of a CTC may occur, in order to protect themselves against the possibility of adverse changes in such rules a firm's contributors may seek various restrictions on or control rights over such changes. Like restrictions on or control rights over changes in the performance metrics of a DCEAS, restrictions on or control rights over changes in the equity class size award rules of a DCEAS are an important design choice for a DCEAS, since they address the trade-off between the desirability of allowing the structure to be modified over time to best match the circumstances that actually prevail over time and the desirability of providing both the firm and its contributors with advance knowledge of how equity will be awarded to specific types of contributor transactions under alternative possible future circumstances. Like control rights over changes in the performance metrics of a DCEAS, basic control rights over changes in the equity class size award rule of the CTCs of a DCEAS are likely to be viewed as appropriate by both the firm and its contributors even for CTCs for which the equity awarded carries few or no other control rights.

Finally, it should be noted that defining the size of an equity class of a CTC as a percentage of the ownership of the firm isolates the size of the class from changes in the size of the equity classes of other CTCs of the DCEAS. In contrast, if the size of an equity class is defined as a number of shares, the size of the class will in general be affected by changes in the size of any other equity class of the DCEAS. As a result, defining the size of an equity class as a percentage of the ownership of the firm provides protection to its holders against changes in the size of other equity classes of the DCEAS, both positive and negative, while defining the size of an equity class as a number of shares does not. For this reason, defining the size of the equity classes of a CTC as a percentage of the firm generally makes it substantially easier to change the equity award rules of one or more CTCs of the DCEAS over time. In addition, even under circumstances under which interactions between the sizes of equity classes of different CTCs are desired, it is frequently easier to manage these interactions through the use of percentage-based equity class sizes than to attempt to manage them indirectly through the issuance of an appropriate number of shares in each of the affected CTC equity classes and in the DCEAS overall over time.

Implementing Increases and Decreases in the Sizes of CTCs Over Time

To implement equity class size award rules of the kind defined above it will in general be necessary to increase or decrease the size of one or more of the equity classes of a DCEAS over time. The firm can increase the size of an equity class defined as an absolute number of shares simply by increasing the number of shares in that class. To decrease the size of an equity class defined as an absolute number of shares the firm can either conduct a reverse split of appropriate size in the class or increase the number of shares in one or more of the other equity classes of the DCEAS. The two approaches differ in that the former directly reduces the size of the CTC, while the later decreases its relative size by decreasing the fraction of the ownership of the firm which it represents.

To increase or decrease the size of an equity class defined as a percentage of the firm, the firm can follow a comparable procedure. To illustrate this it is first necessary to briefly describe how equity classes with sizes defined as a percentage of the firm can be established and maintained. To facilitate the illustration, assume that each of the firm's outstanding shares has been defined to represent the right to an equal share of the ownership of the firm. This does not preclude the definition of different classes of shares, such as classes with different control rights, dividends or priority, as is generally required by multi-class DCEAS structures. Under these circumstances, to establish and maintain an equity class representing ownership of 10% of the firm, for example, it is then only necessary to ensure that the shares of the class comprise 10% of the total number of the firm's outstanding shares at each point in time. If the number of shares in one or more of the firm's other classes is increased for some reason, resulting in an increase in the total number of outstanding shares in the firm, a sufficient number of new shares can be issued in the 10% class to maintain its share of ownership of the firm at 10%. To maintain a constant percentage allocation of the ownership of the 10% class among the shareholders of the class, the new shares issued in the class can be distributed to the existing shareholders of the class in proportion to their ownership of the class. Conversely, if the number of shares in one or more of the firm's other classes is decreased for some reason, leading to an decrease in the total number of the firm's shares outstanding, a reverse split of appropriate size can be conducted in the 10% class so that its share of the ownership of the firm remains at 10%.

If the firm seeks to either increase or decrease the percentage ownership of the firm of a class that is defined as a percentage of the firm, similar steps can be followed. If the class in question is the only class that is defined as a percentage of the ownership of the firm, an increase can be accomplished simply by issuing an appropriate number of additional shares into this class, and a decrease either by issuing an appropriate number of shares in the other classes of the DCEAS or through a reverse split in the class of appropriate size. If the sizes of one or more other equity classes have also been defined as a percentage of the ownership of the firm, when the size of the class of interest is increased through the issuance of additional shares, additional shares must also be issued in each of the other percentage ownership classes in order to maintain their defined percentage ownership of the firm. Likewise, if the size of the class of interest is decreased, reverse splits of appropriate size must be conducted in each such class to maintain its defined percentage ownership. Finally, if the firm wishes to increase the size of one class defined as a percentage of the firm by, in whole or in part, decreasing the size of another class defined as a percentage of the firm, two transactions of the kind described above must be completed simultaneously.

To illustrate procedures of the kind described above with examples, assume that a firm has two CTC equity classes, classes A and B, each with a size currently set to 10% of the firm. Further assume that the firm has a total of 100 shares outstanding, implying that at present each CTC equity class has 10 shares. If the firm wishes to increase the size of class A to 20% of the firm, it can do so by issuing $X_A$ additional shares in class A and $X_B$ additional shares in class B, where $X_A$ and $X_B$ solve the equations:

$$(10+X_A)/(100+X_A+X_B)=20\%$$

$$(10+X_B)/(100+X_A+X_B)=10\%$$

These equations yield the solution $X_A=90/7=12.9$ and $X_B=10/7=1.4$.

As a second example, assume that the firm instead wishes to increase the size of class A to 15% of the firm and simultaneously decrease the size of class B to 5% of the firm. It can do so by issuing X additional shares in class A and conducting a reverse Y for 1 stock split in class B, where X and Y solve the equations:

$$(10+X)/(90+X+10*Y)=15\%$$

$$(10*Y)/(90+X+10*Y)=5\%$$

These equations yield the solution X=5 and Y=½.

As a final example, assume that the firm has a single CTC equity class with size equal to 50% of the firm. Further assume that the firm currently has 100 total shares outstanding, and that it would like to increase the size of the CTC equity class to 60% of the firm. This can be accomplished by issuing X additional shares in the CTC equity class where X solves the equation (50+X)/(100+X)=60%, which yields X=25.

Examples of Equity Class Size Award Rules

To illustrate how equity class size award rules for the CTCs of a DCEAS can be designed to match the characteristics of specific firms, sample equity class size award rules for somewhat expanded versions of examples 1 and 2 above are provided below.

Sample Equity Class Size Award Rules for Example 1

In Example 1 above a market making firm is first established, and then subsequently trades two products over time. As discussed above, a sample set of CTCs for the firm may include a CTC for the initial contributors that help the firm establish its franchise, and CTCs for the on-going trade of each product. Candidate equity class size award rules for these three CTCs are considered below.

The equity class size award rule of the CTC for the initial establishment of the firm's franchise may be specified on either an absolute or conditional basis. If an absolute equity class size is chosen, the size may be specified as either a defined percentage of the firm or as an absolute number of shares, either of which may either increase or decrease over time according to an agreed upon schedule. See FIG. 8 for an example. In particular, FIG. 8 shows an exemplary equity class size award rule for the initial establishment of the firm's franchise.

If in contrast a conditional equity class size award rule is chosen, the firm may wish to condition the amount of the award on how quickly it achieves scale, since more rapid growth will presumably require it to consume fewer resources while operating the firm at less than efficient levels of scale, liquidity, or contributor recognition. To signal the value of more rapid growth to its contributors, the firm may define the size of the equity award for the CTC as a declining function of the amount of time it takes to achieve certain scale targets. Doing so provides its current and prospective contributors with an incentive to bring their business to the firm quickly.

Figure 9A:
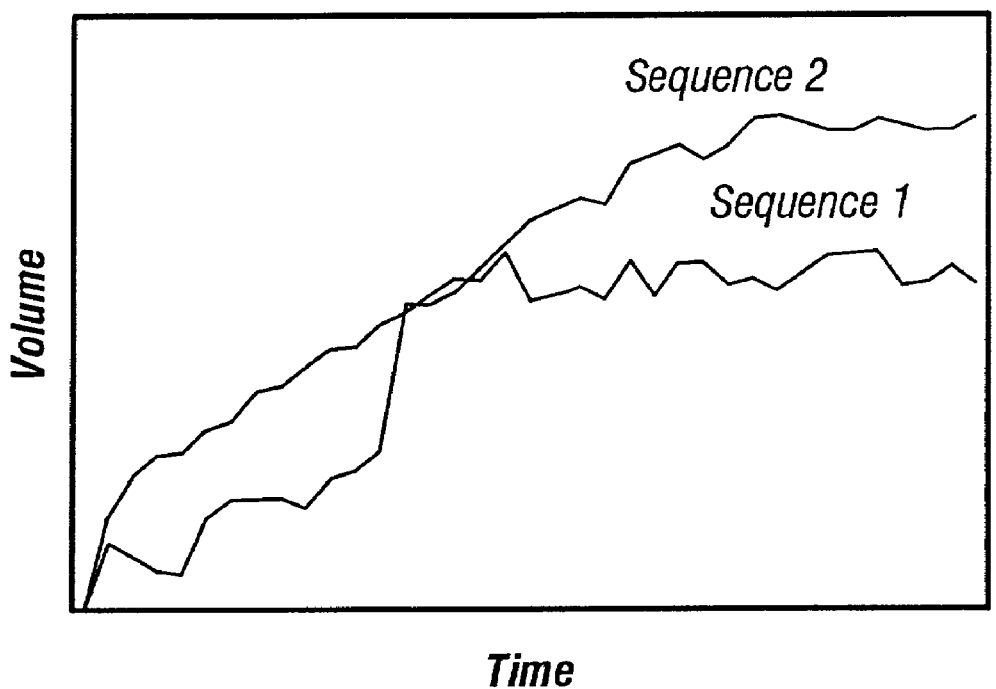
FIGS. 9A–B are graphs that show an initial, exemplary equity class size award rule for a performance metric that includes a timing factor.
Figure 9B:
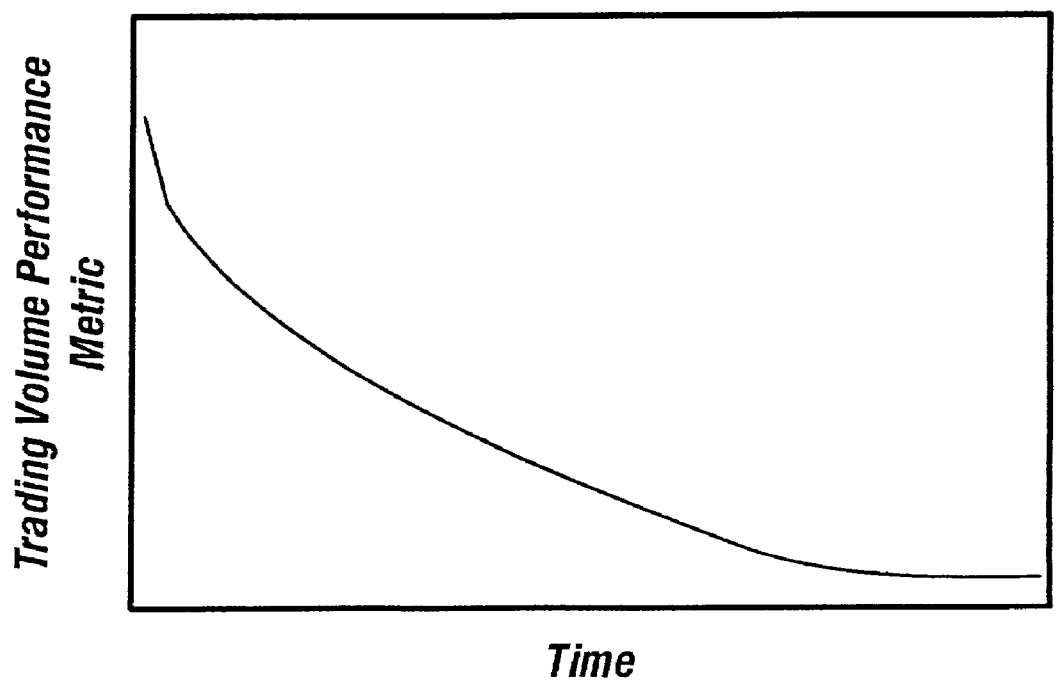

An alternative approach that may serve the same goal with even greater accuracy is to select a performance metric for the CTC based on a combination of the volume of business conducted within the CTC and the time that business is conducted. For example, the performance metric might weight business at each point in time by a "timing factor" for that point in time of the kind shown in FIG. 9, where an example equity class size award rule for the initial establishment of the firm's franchise is based on a performance metric that includes a timing factor. Doing so allows the precise time at which business is conducted to be measured and factored into the equity class size award rule accordingly. In contrast, under the equity class size award rule defined above, which is based on the firm's total volume at a particular point in time, no differentiation is provided between the value of volume transacted at different points in time prior to that time. As a result, while an equity class size award rule based only on the aggregate volume traded by time T would lead to the award of similar amounts of equity for the two sequences of trading volume over time shown in the top panel of FIG. 9, an aggregate equity award rule based on a performance metric that includes the timing factor shown in the bottom panel of FIG. 9 would assign a significantly larger value to volume sequence 1.

Finally, the firm may also choose to structure the equity class size award rule for the establishment of the firm's franchise to allow for the subsequent expansion of the class to compensate contributors that enable subsequent significant expansions of or enhancements to the firm's franchise. This could occur, for example, if the firm is approached by a set of contributors that offer to provide significant trading volume in a third product if the firm agrees to establish and run a market for such a product. Alternatively, rather than expanding its initial "franchise" CTC to compensate the contributors that enable its expansion into market making for a third product, the firm may choose to establish a new CTC for that product upon initiation of its trading.

Like the equity class size award rule for the CTC for the initial establishment of the firm's franchise, the equity class size award rules for each of the two CTCs for the on-going trading of the firm's two products may be specified on either an absolute or conditional basis. Several alternative conditional equity class size award rules based on variables such as the volume of trade in each CTC and the firm's overall scale and competitive position are illustrated below.

Figure 10:
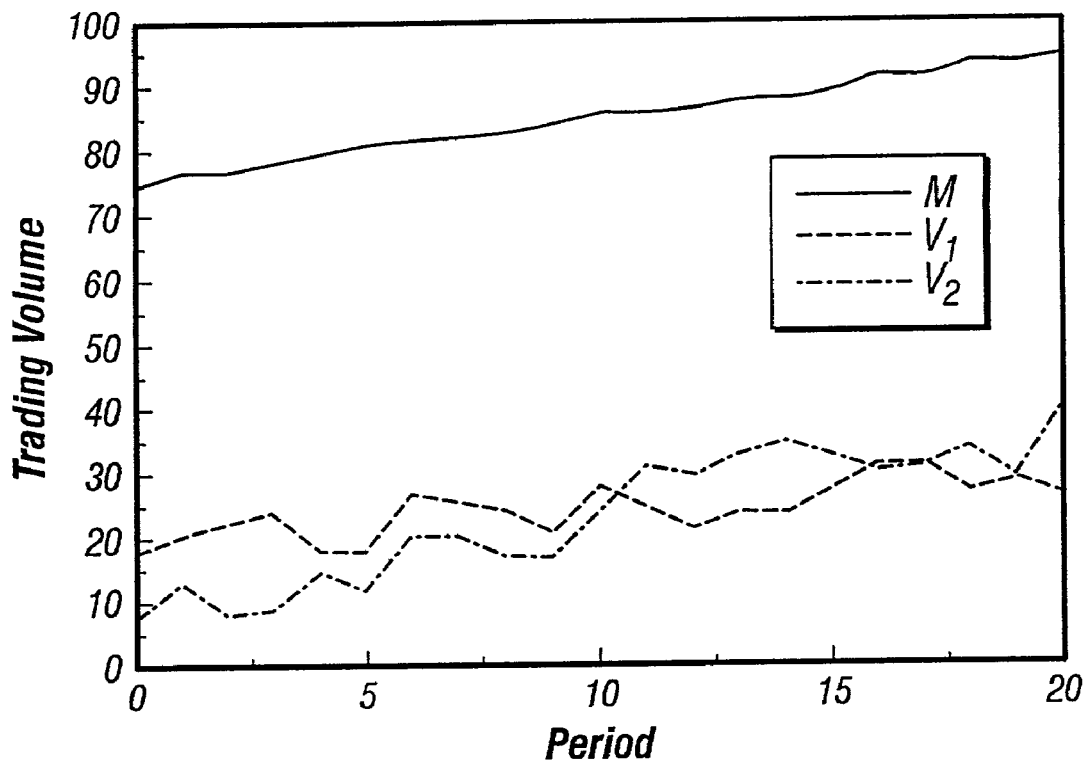
FIG. 10 is a graph that shows exemplary trading volumes for a firm's products over time.
Figure 11:
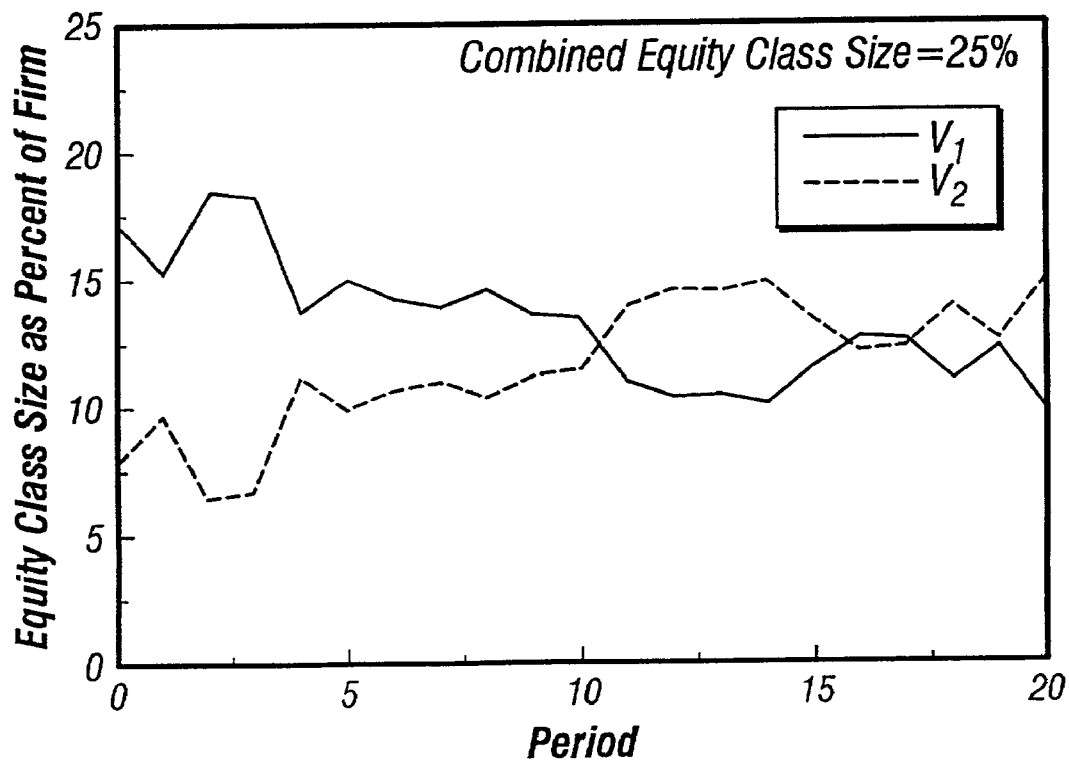
FIG. 11 is a graph that shows exemplary equity class size for the products illustrated in FIG. 10.

FIGS. 10 and 11 show, respectively, the trading volume and the equity class size award for each of the two CTCs under the assumption that the combined size of the two equity class size awards is held constant at 25% of the firm, and that the relative size of the individual equity awards of the two CTCs in each period is set equal to the percentage of the firm's overall trading activity that occurs in that CTC during that period. FIG. 10 shows the firm's trading volumes of Products 1 and 2, respectively $V_1$, and $V_2$, and the combined trading volume M of the two products in all the markets in which they trade. FIG. 11 shows the equity class size for Products 1 and 2 when their combined size is fixed at 25% of the firm and their relative size is set equal to their percentage of the firm's overall trading in the pervious period. In the figures, $V_1$ and $V_2$ are the aggregate trading volumes of Products 1 and 2, respectively, and M is the combined trading volume of the two products across all markets in which the products trade, including both the firm's market and markets operated by the firm's competitors.

Figure 12:
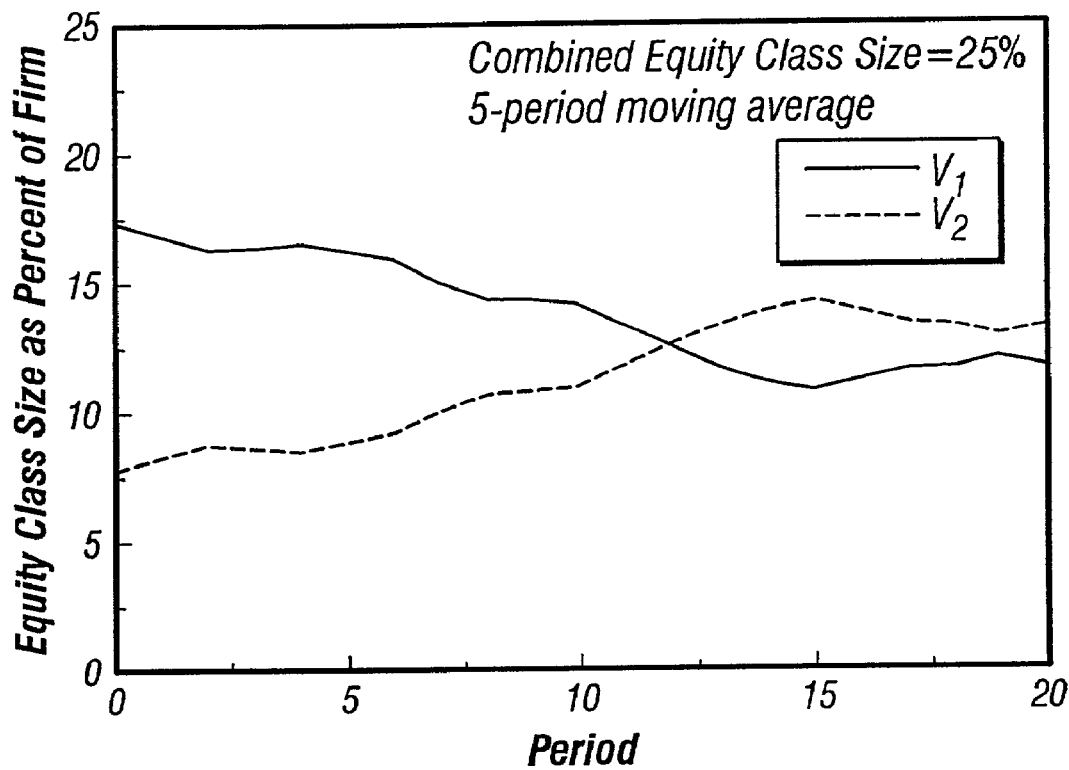
FIG. 12 is a graph that shows exemplary equity class size for the products illustrated in FIG. 10.

FIG. 12 shows the equity class size for each CTC under the same equity award structure except that a moving average of the proportion of the firm's trading activity in each CTC over the previous five periods is used in place of the proportion of the firm's trading activity in each CTC in only the prior period. FIG. 12 shows the equity class size for Products 1 and 2 when their combined size is fixed at 25% of the firm and their relative size is set equal to the moving average of the percentage of the firm's trading activity over the previous five periods.

Figure 13:
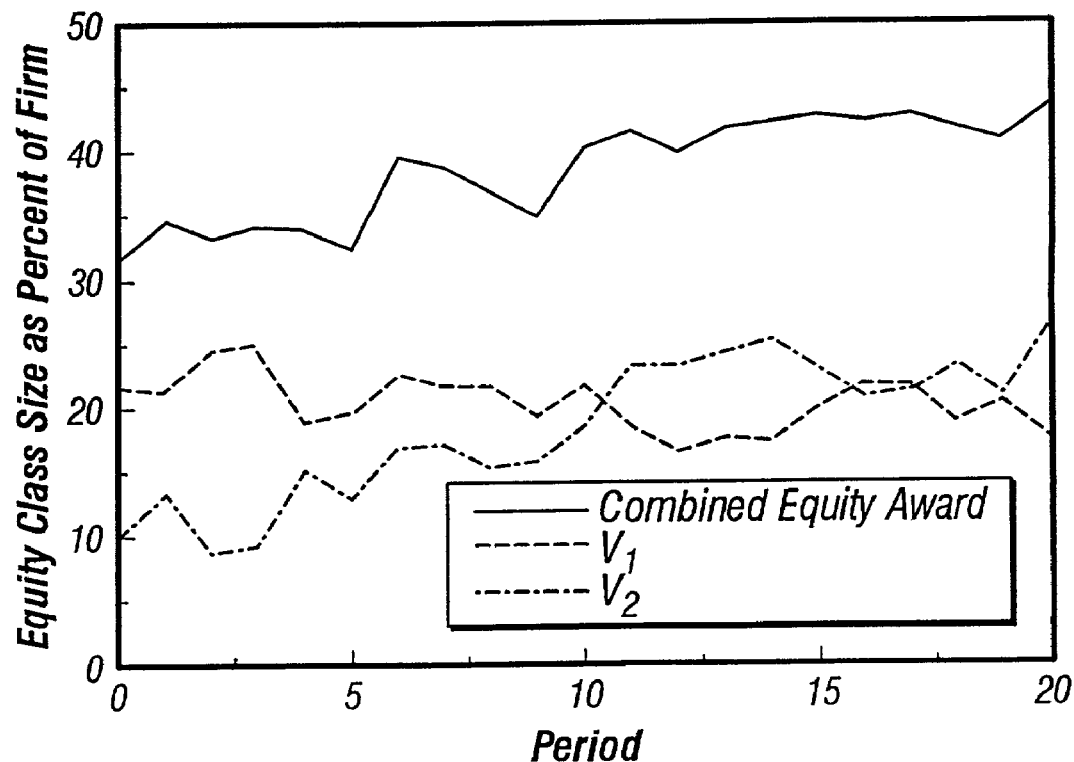
FIG. 13 is a graph that shows exemplary equity class size for the products illustrated in FIG. 10.
Figure 14:
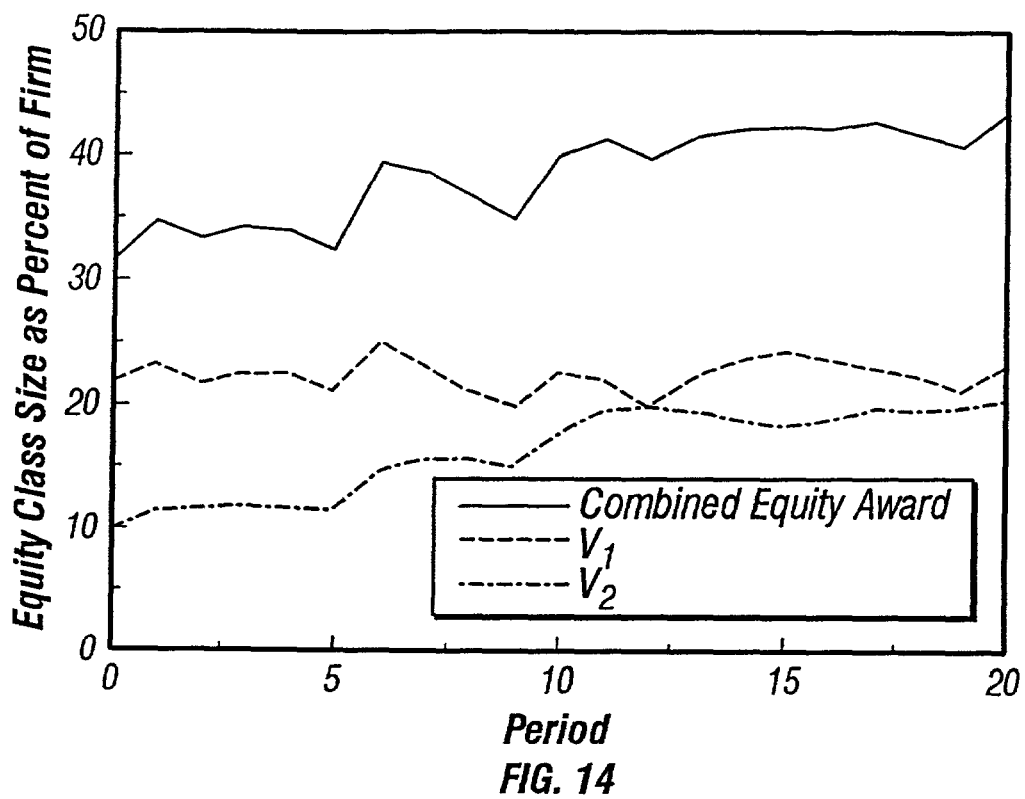
FIG. 14 is a graph that shows the percentage of the class awarded and the amount of ownership per unit purchased for a class.

FIGS. 13 and 14 shows the same single period and five period moving average based award rules, but defines the combined size of the two equity awards to be $20\%+(V_1+V_2)/3M$ where $V_1$ and $V_2$ are the aggregate trading volumes of products 1 and 2, respectively, and M is the combined trading volume of the two products across all markets in which the products trade, including both the firm's market and markets operated by the firm's competitors. This equity award rule has the desirable feature of creating an incentive for the firm's contributors to transfer trading volume from markets operated by the firm's competitors to the firm's own market. For example, if the firm achieves 100% market share in both products the combined size of the two CTCs in question would increase to 20%+33.3%=53.3%. Thus, FIG. 13 shows equity class size for Products 1 and 2 when their combined size is set to $20\%+(V_1+V_2)/3M$, and their relative size in each period is set equal to their percentage of the firm's overall trading in the previous period. FIG. 14 shows the equity award for the two classes when their combined size is set equal to $20\%+(V_1+V_2)/3M$, and their relative size is based on the moving average of their percentage of the firm's trading activity over the previous five periods.

Sample Aggregate Equity Award Rules for Example 2 Above

Like the firm in Example 1 above, the firm in Example 2 above may establish an "early contributors" CTC equity class with a long duration in order to compensate its initial contributors for their role in the establishment of the firm.

Following that, it may choose to establish CTC equity classes for one or more of the range of different products or services it offers over time. To adequately match the size of the equity class of each such CTC with the size of the respective CTC's contribution to the value of the firm over time, the firm may wish to vary the size of each CTC equity class in response to the relative success of each product or service as well as other relevant variables, such as changing market conditions. For example, the firm may wish to allow the size of the relevant CTC equity class to vary over the product's lifecycle, growing during its launch and early life, and shrinking after the product matures. In addition, the firm may wish to adjust the overall scale of such a "product lifecycle" CTC equity class in response to the product's overall success. For example, the overall scale of a CTC equity class may be linked to a product's sales volumes and profitability. Alternatively, the firm may wish to adjust the size of a product's CTC equity class in response to the balance between the supply and demand for the product. For example, the firm may choose to reduce the size of the CTC equity class if it has insufficient supply of the product to meet prospective demand, and to increase the size of the class if it has more supply of the product than it expects to be able to sell.

The firm may also wish to subsequently extend its DCEAS to reflect the interesting relationships that often exist between a firm's overall value, the success of particular products, and the role that product platforms may play in its product offerings over time. Specifically, a single highly successful product may have a sufficiently large impact on the level of acceptance, or installed base, of the product platform on which it is based to have a significant influence on the success of the platform overall, and of other products based on the platform. To capture this relationship between the success of specific products, product platforms, and the firm's overall success and value, the firm may choose to award contributors to the success of extremely successful products equity in the CTC equity class of the product platform on which the product is based, and whose success it has contributed to. Similarly, the firm may choose to award contributors to extremely successful product platforms equity in a CTC equity class linked to the firm's long term franchise value. The resulting DCEAS would thus have CTCs for individual products, product platforms, and the firm's overall "franchise" value, and performance metrics and equity award rules that reflect the linkage between the success of individual products, the product platforms on which they are based, and the firm overall.

The application of a DCEAS of this kind can be illustrated by expanding on the Microsoft Corporation example initiated above. As noted, the Microsoft Corporation "franchise" value was initially established primarily through the success of the "MS-DOS" product platform. Subsequently, Microsoft used its dominance of the "MS-DOS" platform to facilitate the establishment of products such as Microsoft "Word" and "Excel", despite the prior existence of successful competing products such as "WordPerfect" and "Lotus 1-2-3". These complimentary applications in turn expanded and enhanced the value of the Microsoft franchise. The subsequent launch of the Microsoft "Windows" and Microsoft "Office" product platforms then further expanded the scope and value of the Microsoft franchise in both the operating system and applications areas.

Equity Class Allocation Rules

In addition to determining the size of a CTC's equity class over time, the equity award rule for a CTC must also specify how ownership of that class is allocated among the contributors that complete transactions in the CTC over time. In the same way that the equity class size award rules for the CTCs of a DCEAS enable the size of the equity classes of a DCEAS to be dynamically varied so that a match is maintained between their size and the contributions the associated CTCs have made to the value of the firm at each point in time, the equity allocation rules for the CTCs of a DCEAS enable the ownership of the CTC equity classes of a DCEAS to be dynamically allocated so that a match is maintained between the contribution made by specific contributors of a CTC and the fraction of the ownership of that CTC's equity class which these contributors hold over time. Like the ability to dynamically allocate ownership of the firm among the CTC equity classes of a DCEAS based on their relative contribution to the firm, the ability to dynamically allocate the ownership of a CTC's equity class among the contributors of the CTC based on their relative contribution to the CTC is a novel and powerful feature of the DCEAS.

The ownership of a CTC's equity class can be dynamically reallocated using a mechanism with a basic structure similar to the one used to dynamically allocate ownership of the firm among the equity classes of its DCEAS. Specifically, the current percentage ownership of an equity class can be altered by issuing an appropriate number of additional shares within the class and then allocating these shares to contributors of the CTC in a way that achieves the desired ending ownership percentages. As was true for the mechanism for allocating ownership of the firm among its CTC equity classes, and as will be demonstrated below, arbitrary ending ownership percentages can be achieved in an equity class by issuing and allocating new shares within the class in this way.

Before presenting specific examples of the mechanism for allocating ownership within a CTC equity class, it is important to note two of the mechanism's general characteristics. First, under the mechanism new shares may be awarded entirely to contributors that already have an interest in the class, or may awarded in whole or in part to contributors that previously had no interest in the class. Thus the process may have the sole effect of reallocating ownership of the class among its existing owners, or may reallocate ownership of the class among both its existing owners and one or more new owners. Second, since the issuance of additional shares within a CTC equity class may impact the size of the equity class relative to the other equity classes of the DCEAS, once the desired ownership allocation of the class has been achieved it will in general be necessary to resize the class to conform with the equity class size award rule for the CTC. As a result, interactions naturally exist between the equity allocation rule and the equity class size award rule for a CTC. There is in fact no inherent reason to divide the overall equity award rule for a CTC into the equity class size and equity allocation rule components considered here. Dividing the overall equity award rule in this way is generally beneficial, however, since it highlights the two most important roles of the overall equity award rule, which are to determine the size of the relevant CTC equity class, and to determine the allocation of the ownership of the class among the contributors that conduct business in the CTC.

To illustrate how the ownership of a CTC equity class be reallocated using the proposed procedure, consider the following two generic examples. In the first, ownership of the equity class is reallocated among its existing owners. In the second, it is reallocated among both existing and new owners.

Reallocation Among Existing Owners of a CTC Equity Class

As the simplest possible example of how ownership can be reallocated among the existing owners of a CTC equity class, assume that Contributor 1 currently holds $X_1$ percent of the class and Contributor 2 currently holds $X_2$ percent of the class, where $X_2=100\%-X_1$. Further assume that the firm would like to change the percentage ownership of the class held by Contributor 1 to $X_3$ and of Contributor 2 two $X_4$, where again $X_4=100\%-X_3$.

For simplicity, assume that before the reallocation there are 100 shares outstanding in the class. To achieve the desired reallocation, the firm must issue $Y_1$ additional shares to Contributor 1 and $Y_2$ additional shares to Contributor 2, where $Y_1$ and $Y_2$ solve:

$$(X_1+Y_1)/(100+Y_1+Y_2)=X_3$$

$$(X_2+Y_2)/(100+Y_1+Y_2)=X_4$$

For example, if $X_1=50\%$, $X_2=50\%$, $X_3=40\%$ and $X_4=60\%$, $Y_1=50$ and $Y_2=100$. Thus the firm should issue a total of $Y_1+Y_2=Y=150$ new shares, and allocate $Y_1/Y=33.33\%$ of them to contributor 1 and $Y_2/Y=66.67\%$ of them to contributor 2. As discussed above, once the desired percentage allocation of the ownership of the class has been achieved, the relative size of the class can be increased or decreased as required to remain consistent with the equity class size award rule for the relevant CTC using the methods for altering the size of the equity classes of a DCEAS presented above.

The example above can easily be generalized to the reallocation of the ownership of equity classes with an arbitrary number of contributors with arbitrary pre- and post-reallocation ownership shares. To demonstrate this, let X represent the total number of shares currently outstanding in the class, and let x represent a vector with n components $(x_1, x_2, x_3, \ldots x_n)$, where component $x_i$, i=1,2, ... n represents the current percentage ownership of the equity class held by the $i^{th}$ contributor of the n current contributor-owners of the class. Similarly, let x* represent the n-dimensional vector whose components give the desired post-reallocation percentage ownership of the equity class among each of the n current contributor-owners of the class. In this case the desired reallocation can be achieved by issuing Y additional shares and allocating these shares to the current customer-owners of the class according to the n-dimensional vector y where component $y_i$, i=1,2, . . . n represents the number of additional shares awarded to contributor i and where the number Y is equal to the sum of these components of the vector y for values of Y and the vector y that solve the following system of n equations:

$$(x_1^* X + y_1)/(X+Y) = x_1^*$$

$$(x_2^* X + y_2)/(X+Y) = x_2^*$$

$$(x_n^* X + y_n)/(X+Y) = x_n^*$$

This linear system of n equations with n unknowns has a unique solution that achieves the desired reallocation.

Reallocation Among Existing and New Owners of an Equity Class

Reallocation of the ownership of an equity class among both its prior owners and one or more new owners can be achieved in a very similar manner. Specifically, as above let X represent the total number of shares currently outstanding in the class, and let x represent a vector with n components $(x_1, x_2, x_3, \ldots x_n)$, where component $x_i$, i=1,2, . . . n represents the current percentage ownership of the equity class held by the $i^{th}$ contributor of the n current contributor-owners of the class. Assume that the firm wishes to add m new contributors to this current set of contributor-owners. Accordingly, define x* to be the n+m-dimensional vector, the components of which give the desired post-reallocation shares of the percentage ownership of the equity class of the n+m contributors that will hold ownership positions in the class after the reallocation. In this case the desired reallocation can be achieved by issuing Y additional shares and allocating these shares to the current contributor-owners of the class according to the n+m-dimensional vector y where component $y_i$, i=1,2, . . . n+m represents the number of additional shares awarded to contributor i and where the number Y is equal to the sum of these components of the vector y for values of Y and the vector y that solve the following system of n+m equations:

$$(x_1^* X + y_1)/(X+Y) = x_1^*$$

$$(x_2^* X + y_2)/(X+Y) = x_2^*$$

$$(x_n X + y_n)/(X+Y) = X_n^*$$

$$y_{n+1}/(X+Y) = x_{n+1}^*$$

$$y_{n+2}/(X+Y) = x_{n+2}^*$$

$$y_{n+m}/(X+Y) = x_{n+m}^*$$

This linear system of n+m equations with n+m unknowns has a unique solution that achieves the desired reallocation.

Designing Equity Allocation Rules That Effectively Match Contributor Contributions to the Value of the Equity They are Awarded In the discussion above mechanisms that allow any desired reallocation of the ownership of a CTC equity class over time to be achieved were presented. The objective of the equity allocation rule for a CTC is to utilize this capability to match the contribution that individual contributors of the CTC make to the value of the firm as closely as possible over time to the characteristics of the ownership of the firm which they are awarded. Since the discussion in the section above on the sizing of the equity class of a CTC emphasized the appropriate selection of the amount of equity to be awarded in aggregate to the contributors of the CTC, the discussion in this section focuses on the allocation of this aggregate amount of equity among the contributors of the CTC. Appropriate equity award rules for situations in which the selection of the size of the equity class of a CTC and the allocation of the ownership of the class are closely linked are also discussed below.

The most important capability enabled by the ability to dynamically reallocate ownership of a CTC equity class over time is the capability to determine the effective duration of the equity awarded to contributors of the CTC over time. The term "duration" of equity award is used in this context to refer to the rate at which the size of a specific equity award in a CTC is reduced over time through dilution of the class. The ability to set the duration of the equity awarded in a CTC to essentially any level desired creates a powerful and previously unavailable ability to match the duration of the equity awarded to the duration of the contribution to the value of the firm made by particular classes of contributor transactions. Thus while in the past firms were required to issue equity with a single, effectively infinite duration to all contributors irrespective of the characteristics of their contribution to the value of the firm, using a DCEAS firms can offer a range of equity classes, each with a duration matched to the duration of the contribution made to the value of the firm by transactions in the CTC for which the equity class has been designed.

To illustrate how equity allocation rules can be designed to simply and effectively leverage this ability of a DCEAS, a range of examples follows. The first provides an extended description of a particularly simple and powerful equity allocation rule structure, referred to hereafter as the "percentage dilution" equity allocation rule structure.

Percentage Dilution Equity Allocation Rules

Under a percentage dilution equity allocation rule, the number of new shares issued in the relevant equity class in each period is specified as a percentage of the number of shares then outstanding in that class. To more fully define this type of rule and to illustrate several of its most important characteristics, a simple example of the rule is presented and analyzed below.

Assume that 30% of the ownership of firm A has been allocated to the single CTC of the firm's DCEAS. For simplicity, the CTC is defined to include all of the firm's business, and the performance metric for the CTC in each period is defined to be the revenue which customers provide to the firm during that period. The period length is chosen to be one month. To focus attention on the reallocation of ownership of the class over time according to the equity allocation rule, the equity class size award rule for the CTC is assumed to simply specify that the size of the class will remain at 30% of the ownership of the firm over time. Finally, assume that a percentage dilution equity allocation rule has been chosen for the CTC. The rule specifies that at the end of each period a number of new shares equal to X % of the number of shares then outstanding in the CTC equity class will be issued, and these shares will be allocated to the firm's contributors during that period based on their relative contribution to the firm during that period, as measured by the revenue based performance metric for the class.

To illustrate the proposed equity award rule, assume that 100 shares are currently outstanding in the CTC equity class, 50 of which are held by contributor 1 and 50 of which are held by contributor 2, and that X=20%. At the end of the current month, the firm will accordingly issue 100*20%=20 new shares. Assume that the firm had three contributors during the month, previous contributors 1 and 2 and a new contributor, contributor 3. Further assume that contributors 1 and 2 each provided 25% of the firm's revenue during the month, and that contributor 3 provided the remaining 50%. Based on the revenue performance metric, the firm would award 25%, or 5 of the 20 new shares issued, to both contributors 1 and 2, and the other 50%, or 10 of the 20 new shares issued, to contributor 3. As a result, of the total 120 shares outstanding in the CTC equity class at the end of the month after the issuance of the new shares, contributors 1 and 2 would each hold 55 shares, and contributor 3 would hold 10 shares. On a percentage basis, contributors 1 and 2 would thus see their ownership share of the class drop from 50% (50/100) to 45.8% (55/120). As a new contributor, contributor 3 would receive an initial ownership share of 8.3% (10/120).

Properties of the Percentage Dilution Equity Allocation Rule

The percentage dilution equity allocation rule defined above causes ownership of the CTC equity class to be reallocated dynamically over time at a rate determined by the percentage chosen. As a consequence, the firm's contributors know that each period they will collectively be awarded ownership of the specified percentage of additional CTC equity class shares, and that the number of shares they receive individually will be determined based on the number and type of transactions they complete in the CTC that period and the CTC performance metric. Since this is true in each period, contributors can easily determine the fraction of the CTC equity class they will own at any future period under different assumptions about the percentage of the firm's business they will comprise over time. Similarly, they can also determine how the share of the CTC equity class which they currently own will be diluted over time, and thus reallocated away from them.

Figure 15A:
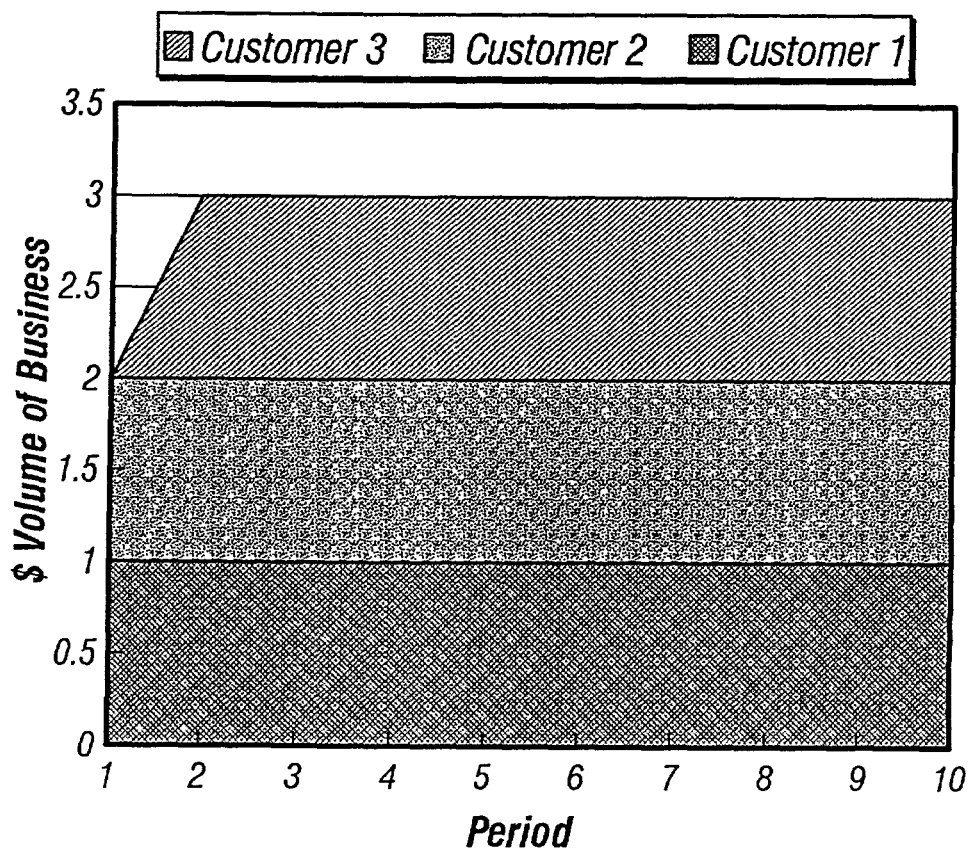
FIGS. 15A–C are a series of graphs that show how the percentage ownership of a CTC equity class would be allocated over the first ten periods of the life of the class.
Figure 15B:
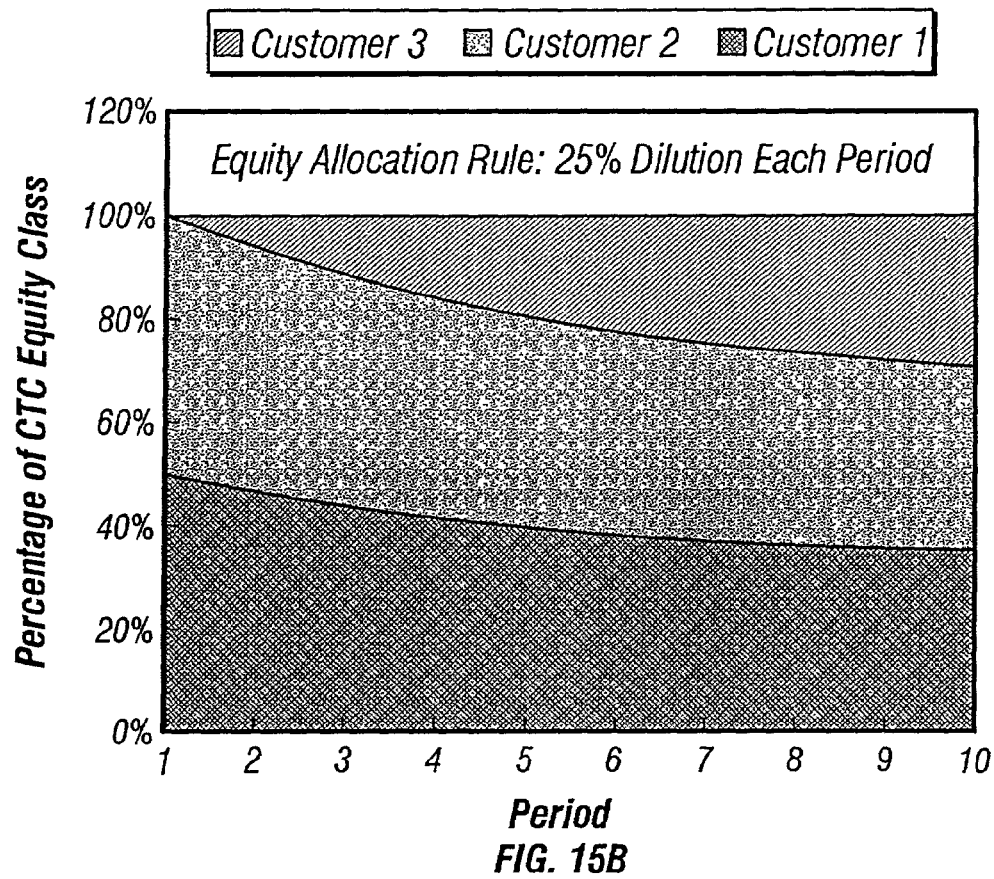
Figure 15C:
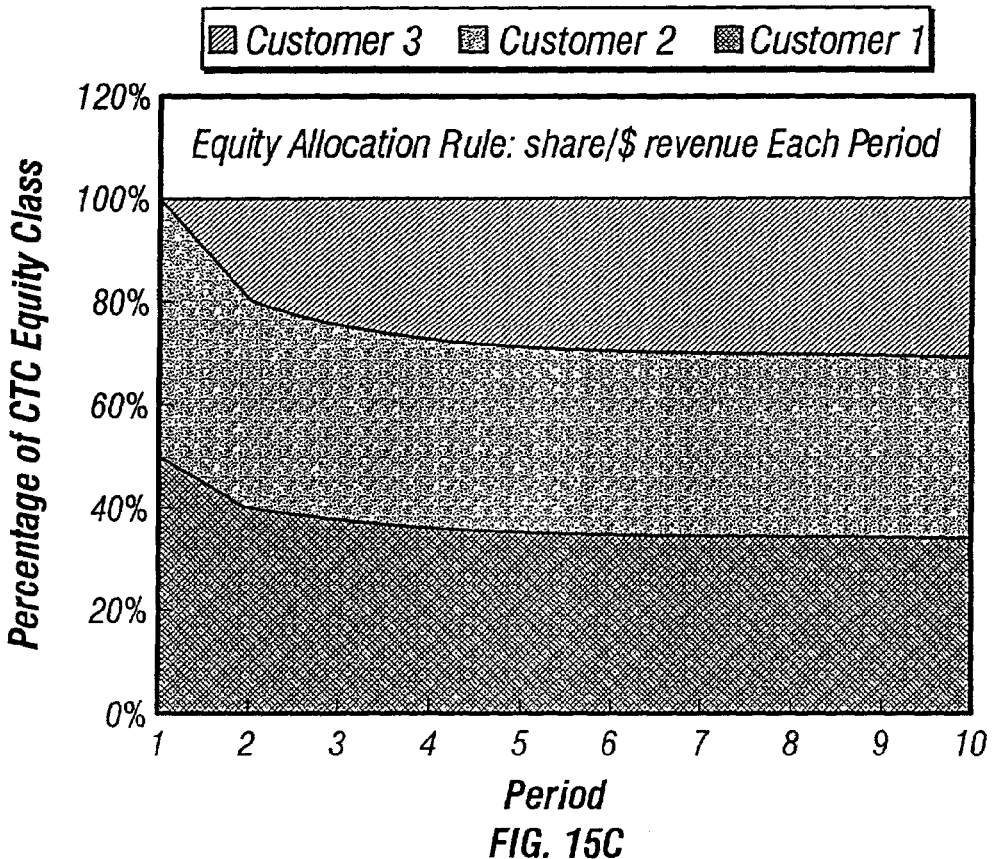

It is important to note that defining the equity award as a percentage of the number of shares outstanding is necessary to yield many of these simple features. Note, for example, that an award rule specified in terms of an absolute number of shares would either result in the issuance of a declining percentage of new shares over time (as the number of shares outstanding increases) or would require a more complex specification of the actual (increasing) number of shares to be issued over time. These effects are illustrated in FIGS. 15A–C and 16A–C. FIGS. 15A–C show how the percentage ownership of a CTC equity class would be allocated over the first ten periods of the life of the class under the assumption that the firm has three contributors over that period with the business volumes shown in the figure, and that the performance metric for the CTC is the dollar volume of business conducted with the firm. In the figures, two alternative equity allocation rules for the CTC equity class are shown. In the first, the equity award rule is 25% dilution each period. In the second, one share of CTC equity is awarded for each unit of volume. Since the CTC equity class has just been established, the number of shares outstanding is small and the two equity allocation rules result in roughly similar allocations of the class.

Figure 16A:
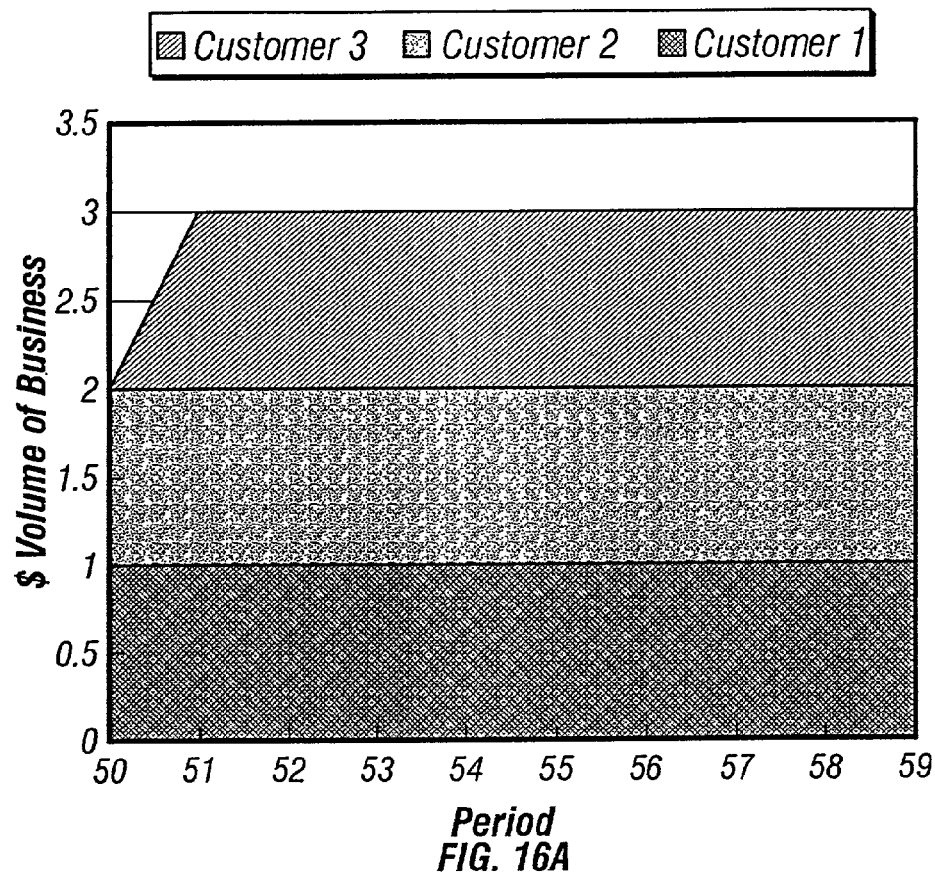
FIGS. 16A–C are a series of graphs that show how the percentage ownership of a CTC equity class would be allocated with a delayed entry of Contributor 3 into the equity allocation rules.
Figure 16B:
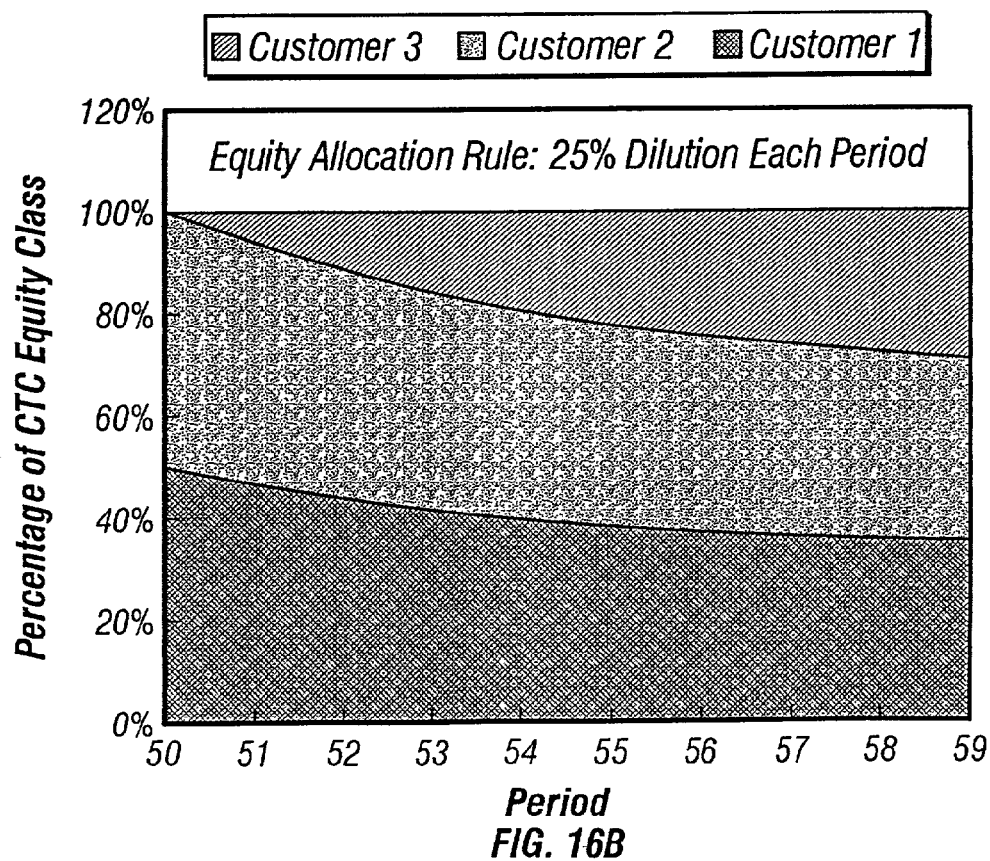
Figure 16C:
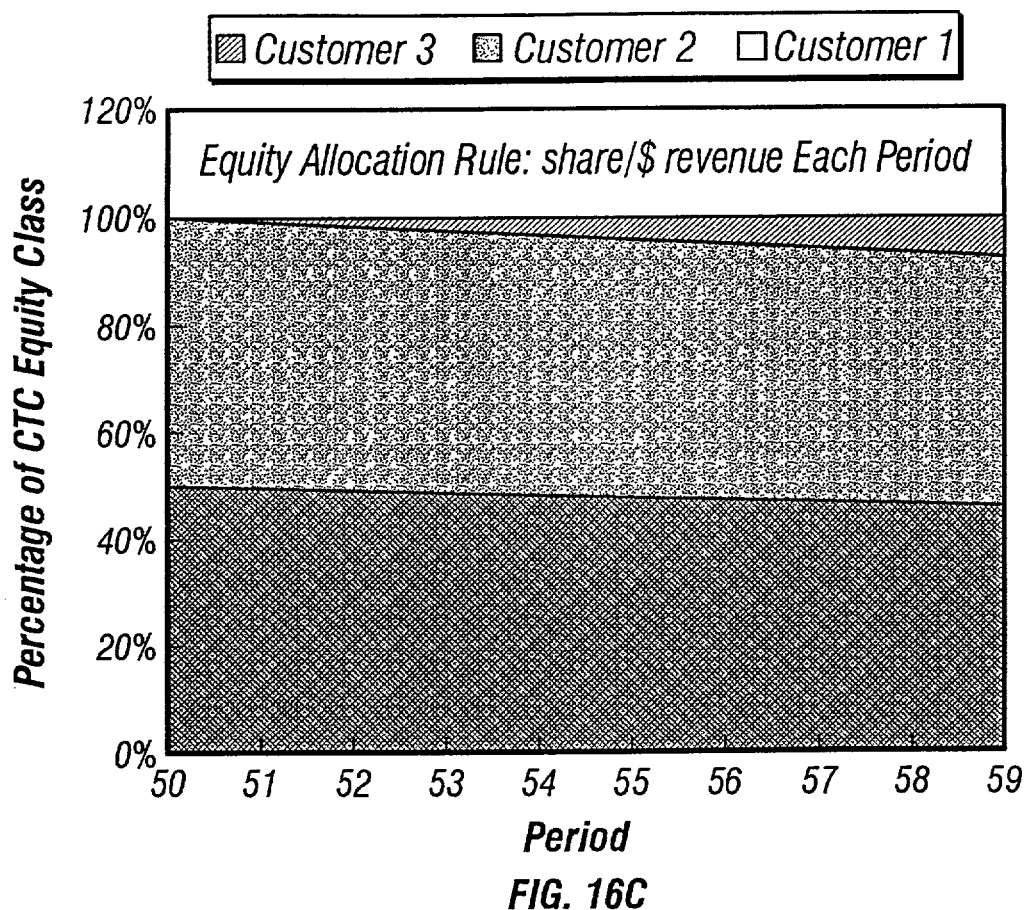

In FIGS. 16A–C the same two equity allocation rules are shown. In these figures, however, Contributor 3 does not enter until 50 periods after the establishment of the CTC. Since the number of CTC shares outstanding by that time is large, under the one share of equity per unit of volume equity allocation rule Contributor 3 is allocated only a very small share of the ownership of the class. In contrast, since the percentage dilution equity allocation rule causes ownership of the class to be reallocated at a rate that is independent of the amount of time the class has been in existence, under this rule Contributor 3 takes ownership of the class at the same rate as in FIGS. 15A–C. This characteristic of the percentage dilution allocation rule allows equity in the class to reallocated at a constant rate over time through a mechanism that is easy to understand and simple to implement.

Impact of Percentage Dilution Rate on Rate of Reallocation of CTC Equity Class

Figure 17:
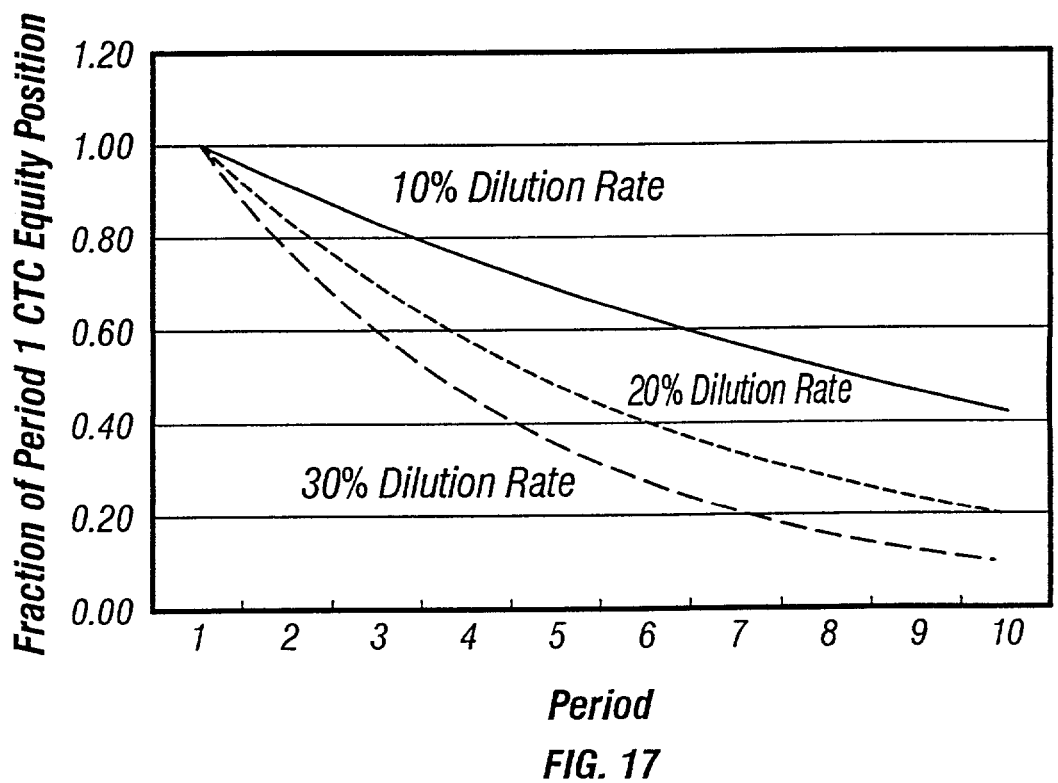
FIG. 17 is a graph that shows percentage dilution rate impact on the rate of reallocation of CTC equity class.

The percentage of new shares issued in the CTC equity class each period is an important decision variable in the DCEAS example above since it determines the rate at which ownership of the CTC equity class is reallocated over time. This is true because a higher percentage causes a greater percentage of new shares to be issued each period, which in turn gives contributors to the firm during that period a greater percentage of the ownership of the class at the end of the period. The net result is that ownership of the class is reallocated more rapidly. This effect is illustrated in FIG. 17, which shows the impact of percentage dilution rate on rate of reallocation of CTC equity class. The figure shows, for a variety of percentage dilution rates, the percentage of the CTC equity class which the owners of the class at time 1 would own at each subsequent point in time if they conduct no more business with the firm. As the figure shows, the rate at which ownership of the class is reallocated increases exponentially as the percentage dilution rate increases.

Impact of Percentage Dilution Rate on "Duration" of Equity Awarded in the CTC Equity Class The ability to control the rate at which ownership of the CTC equity class is reallocated through the selection of the percentage dilution rate provides a simple yet powerful mechanism with which to control the "duration" of the equity awarded to contributors in exchange for their contribution to the firm. For example, if the contributors' business has a sustained impact on the value of the firm, lower rates can be selected, causing the reallocation of the ownership of the CTC equity class to be slow and the effective duration of the shares awarded to be long. This case corresponds to the upper lines in FIG. 17, where once established ownership is sustained for a significant period of time. Alternatively, if the impact of the contributor's business is more temporary in nature, higher rates can be selected, causing more rapid reallocation of the class and a shorter effective duration of the shares awarded. This case corresponds to the lower lines in FIG. 17, where ownership is more rapidly reallocated over time.

Impact of CTC Equity Allocation Rule on Ownership Structure of Other CTCs in a DCEAS It is important to note that the process of dynamic reallocation of equity within a particular CTC equity class has no effect on the ownership shares of the shareholders of the other equity classes of the structure. For example, in the example above, the ownership structure of the remainder of the firm is completely unaffected by the dynamic allocation of the ownership of the CTC equity class in question. This allows the awards and incentives generated by the dynamic allocation process of the equity allocation rules of a DCEAS to be individually tailored to the requirements of the specific CTCs of the structure.

Impact on the Incentives and Risk of Contributors and the Firm

Since in the example above the amount of ownership a contributor receives in each period is based on the proportion of the firm's revenue which the contributor provides in that period, the structure provides contributors with a clear incentive to increase the amount of business they do with the firm. For the same reason, the structure manages the risk to which uncertainty about the level of the firm's future business volume exposes both the contributor and firm. Specifically, if the firm's business volume turns out to be small, the contributor receives a larger share of ownership of the firm for each dollar of revenue that it provides to the firm, in effect giving it a "larger piece of a smaller pie". Similarly, if the firm's business volume turns out to be large, it receives a smaller share of ownership, but one that represents a "smaller piece of a larger pie". The firm's risk is managed in a similar way; the more successful it is, the smaller the percentage of the firm it must award per dollar of revenue. Thus the dynamic nature of the structure generates incentives that dynamically adjust to currently prevailing conditions, and which dynamically manage the risk to which both firms and their contributors are exposed. Note, for example, that in the example above contributors have an incentive to shift their business with the firm from the firm's busy periods to its slower periods, thereby smoothing the cyclical swings in its business, since by doing so they will receive more shares per dollar of revenue which they provide to the firm. Methods of further refining structures of this kind will be described below.

Varying Percentage Dilution Rate

As discussed above, the percentage dilution rate used in each period determines how ownership of a CTC equity class is allocated between the contributors of the CTC during that period and the previous contributors of the CTC. As noted above, by determining the rate at which the CTC equity class is reallocated over time, from a dynamic perspective this property of the percentage dilution rate causes it to determine the duration of the shares awarded. For example, as the rate increases, new contributors are awarded relatively more equity, and the incentives for contributors to conduct business with the firm on an on-going basis are strengthened. As a result, the percentage dilution rate equity allocation rule provides a simple and effective way to match the duration of the equity awarded to the duration of the contribution that particular types of contributor transactions make to the firm.

In the simple example presented above, the percentage dilution rate was held constant over time. This may be appropriate if the firm's business activities and competitive environment are stable over time, and is also desirable because of its simplicity. However, if factors that have an important impact on the value of the contributor transactions of the relevant CTC, such as how the nature of the firm's business activities, competitive environment, or contributor base change or evolve over time, the firm may wish to vary the percentage dilution rate to reflect these changing circumstances. Similarly, the firm may wish to vary the rate to alter the incentives which the equity allocation rule provides to contributors of the CTC.

For example, if the contributor transactions of the CTC shift from long term contracts or products and services with long useful lives to shorter term contracts or products and services with shorter useful lives, the firm may choose to shorten the duration of the equity awarded in the CTC. Similarly, the firm may choose to increase the percentage dilution rate to provide additional incentives to its prospective contributors, who will take ownership of the CTC equity class more quickly if the rate is increased. Alternatively, the firm may choose to decrease the percentage dilution rate to reward its existing CTC equity class shareholders, who will see the duration, and thus value, of their current ownership of the equity class increase as a result.

Figure 18A:
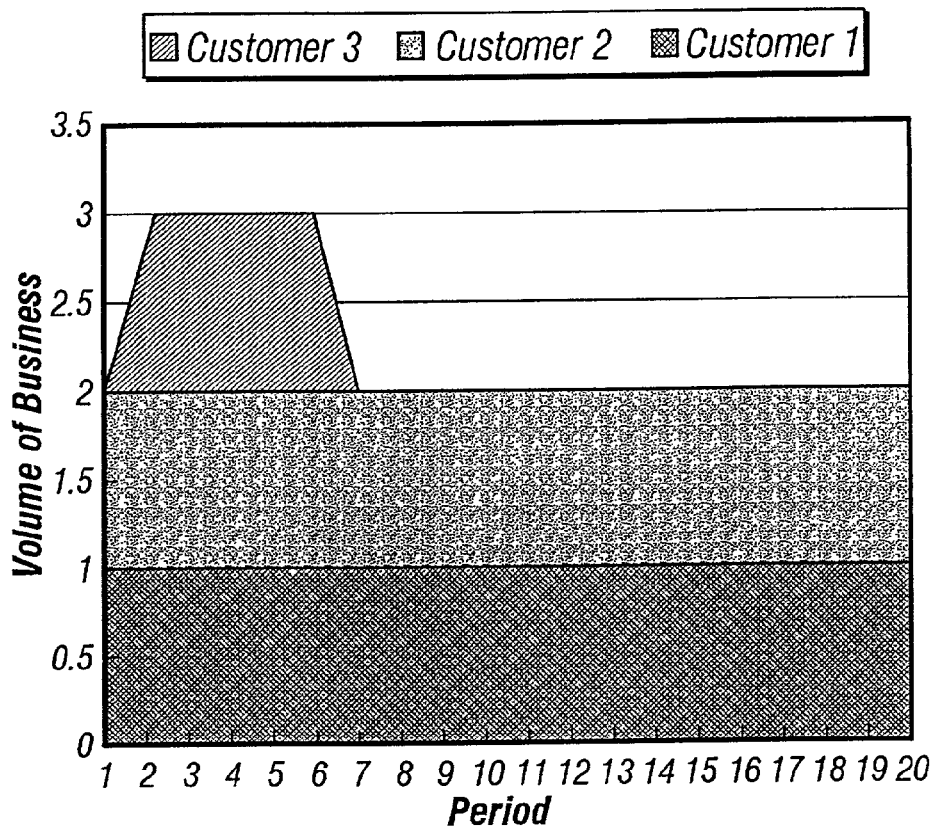
FIGS. 18A–C are a series of graphs that show the effect of percentage dilution rate on equity reallocation.
Figure 18B:
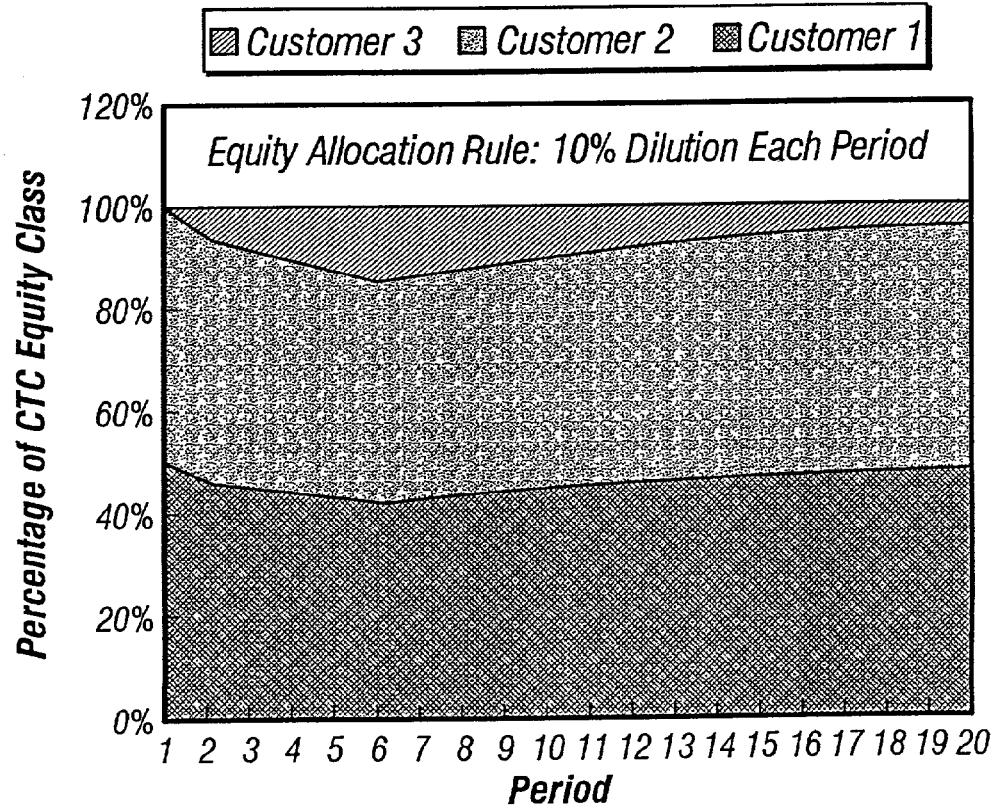
Figure 18C:
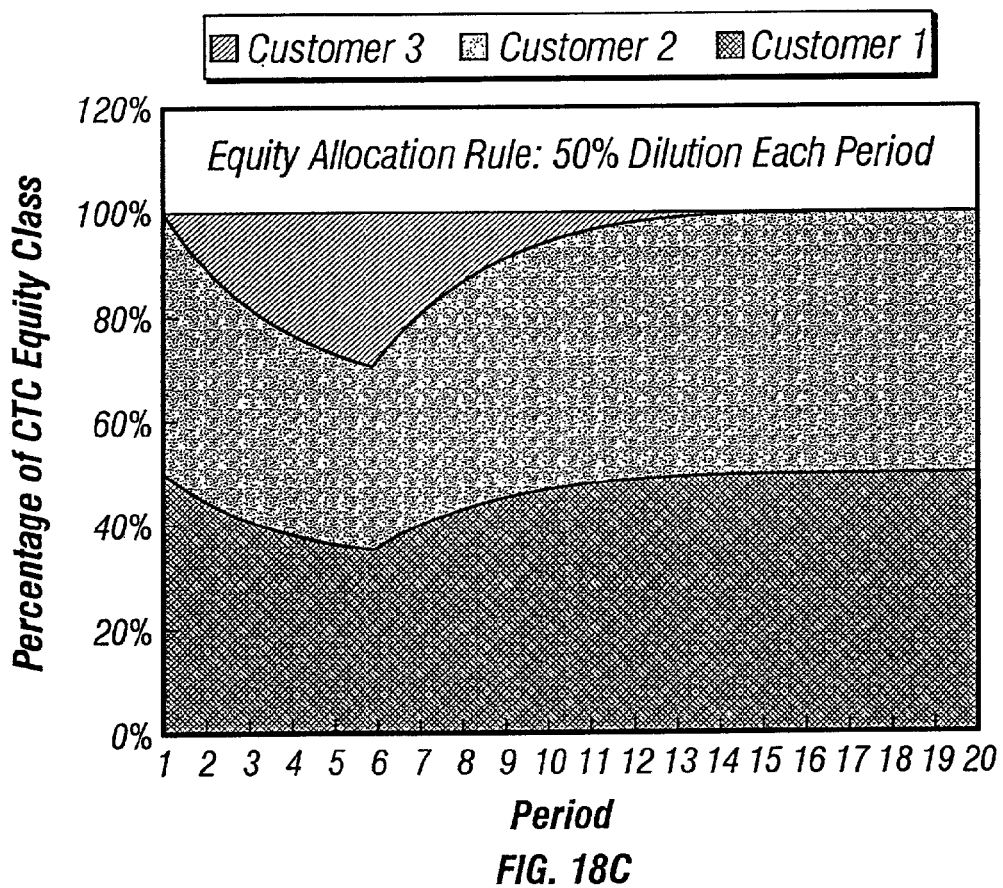

FIGS. 18A–C illustrate these effects by showing how quickly equity is allocated to and then reallocated away from a short term contributor of a CTC in which the other transactions of the CTC are completed by two long term contributors. In FIG. 18B, the firm is assumed to use a 10% percentage dilution rate to allocate equity in the equity class of the CTC. This relatively slow rate causes the short term contributor to take ownership of a relatively small amount of equity during its term as a contributor. In FIG. 18C the firm is assumed to use a 50% percentage dilution rate. This relatively high rate causes the short term contributor to take ownership of significantly more equity during its term as a contributor. However, the higher rate also causes the contributor's equity stake to be reallocated back to the long term contributors of the CTC more quickly after it stops doing business in the CTC.

Figure 19A:
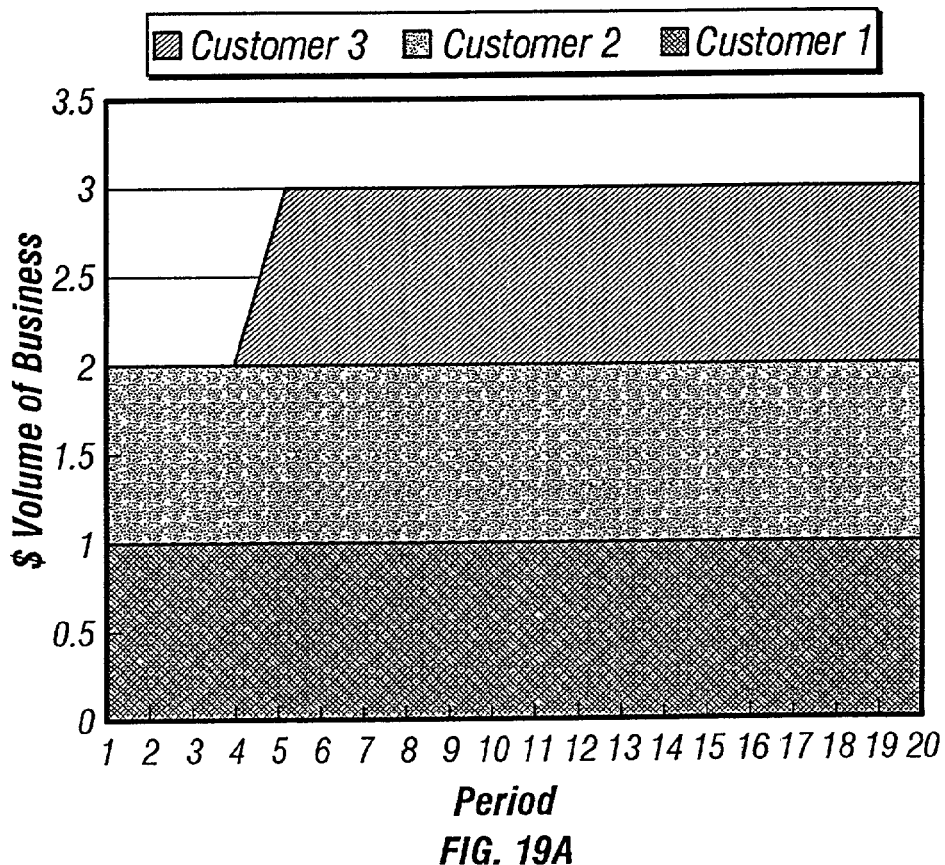
FIGS. 19A–C are a series of graphs that show equity reallocation for a CTC equity class of fixed size.
Figure 19B:
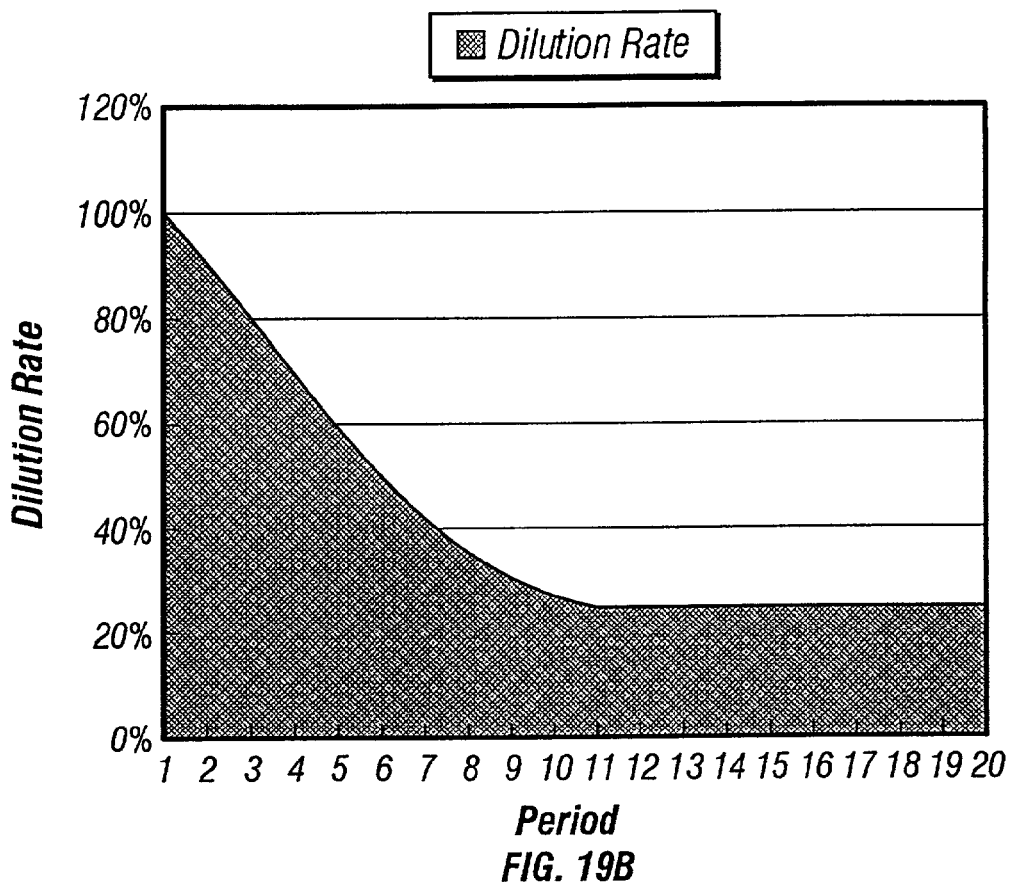
Figure 19C:
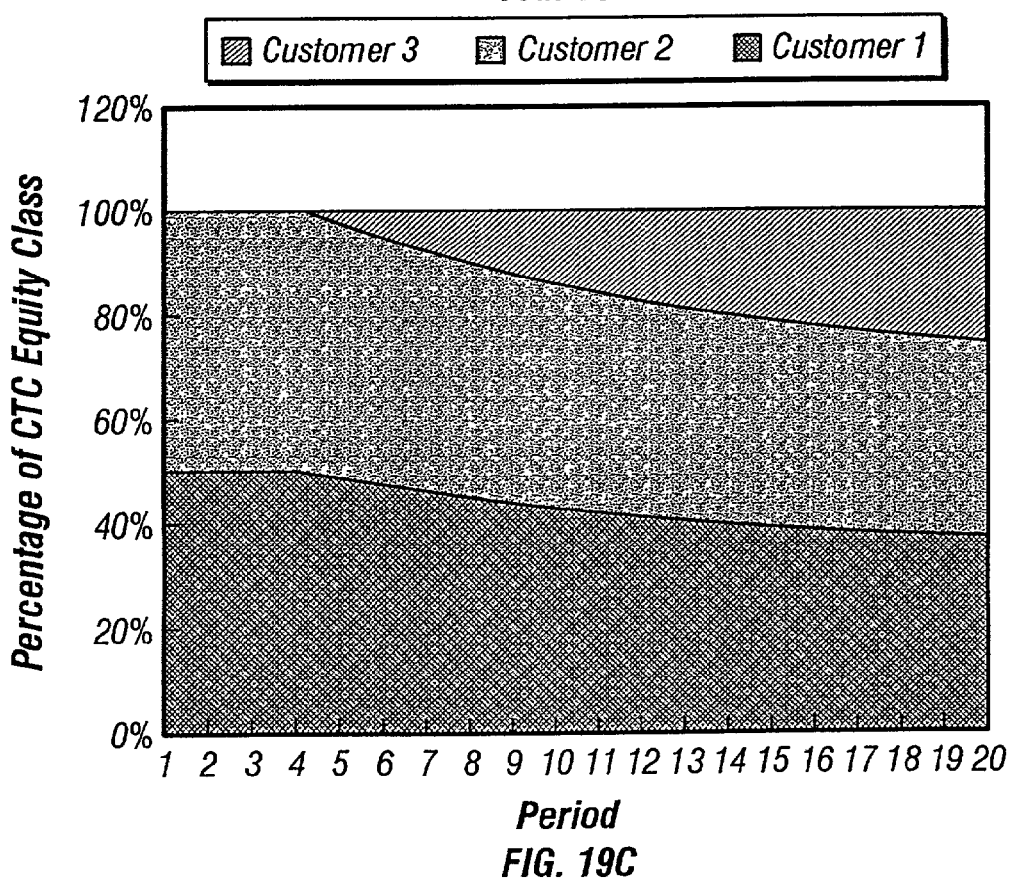

As a second example of how changes in the percentage dilution rate can be tailored to a specific situation, consider how a firm might choose to establish the initial ownership of a CTC equity class of fixed size. Specifically, assume that the firm has decided to establish a CTC equity class representing ownership of 25% of the firm. To establish the initial ownership of the class, it selects the following process. First, it awards the initial ownership of the class to the contributors of the CTC during the period preceding the establishment of the class. Conceptually, this is analogous to a 100% rate of dilution during the first period of the existence of the class. This is desirable to the initial contributors of the CTC, since the amount of ownership they are awarded is large relative to the amount of business they have conducted with the firm. To compensate for the size of this initial award, the firm may choose a subsequent series of high but declining percentage dilution rates during the periods immediately following the establishment of the class. Doing so reduces the duration of the shares initially awarded in the equity class, thereby offsetting the benefit of the large percentage of ownership which the shares initially represent. The phase-in of the ownership of the class may then be completed by gradually reducing the percentage dilution rate used over time until the rate reaches the desired "steady-state" percentage dilution rate. FIGS. 19A–C provide a graphical representation of this approach.

The firm may also choose to vary the percentage dilution rate used in a CTC each period in response to either anticipated or actual fluctuations in the aggregate performance metric for the CTC, or in other relevant variables. For example, the firm may wish to specify variations in the percentage dilution rate over time in advance based on expected cycles in the contributor transaction volume in the CTC due to seasonal or other forecasted fluctuations. Alternatively, the firm may wish to scale the percentage dilution rate up and down over time in response to fluctuations in the volume of business which its contributors actually conduct over time, or in variables such as its cost structure or available capacity.

As a third example, the firm may choose to define the percentage dilution rate used each period as a function of the aggregate performance metric or metrics of the CTC. As a simple example of such a function, the percentage of equity awarded could be specified to fluctuate up and down in direct proportion to the aggregate performance metric of the CTC, or as either some amplified or dampened function of this metric. As discussed above, the completely dampened case of a constant percentage dilution rate generates a strong incentive for contributors to attempt to smooth their contribution to the firm over time, as measured by the performance metric. This is true because under a completely dampened percentage dilution rate equity allocation rule more equity is awarded per unit of contribution (as measured by the performance metric) during periods when the aggregate contribution (as measured by the aggregate performance metric) is low. Similarly, less equity is awarded per unit of contribution during periods when the aggregate contribution is high.

If instead the percentage dilution rate is specified to vary in proportion to the aggregate performance metric, contributors will receive a consistent level of compensation for their contribution to the firm as measured by the performance metric. As a result, the incentive for contributors to smooth their contribution to the firm will be eliminated.

It is important to note that allowing the percentage dilution rate to vary in response to variations in the aggregate performance metric, or to other relevant aspects of the firm's business environment, will cause the duration of the shares the firm awards to vary over time. If the average of the percentage dilution rates over time is relatively consistent, however, this effect should be small.

Absolute Equity Award Rules

As discussed above, under some circumstances it may be desirable to specify either or both the equity class size and equity allocation rule of a CTC in absolute rather than percentage terms. For example, the firm may choose to issue a fixed number of shares for each unit of contributor contribution during a given period, as measured by the CTC's performance metric or metrics during that period. Alternatively, it may choose to issue a fixed number of new shares each period to be allocated based on the CTC's performance metric or metrics.

While "absolute" equity award rules of this kind may at first appear to offer a more direct link between the contributor transactions of a CTC and the amount and type of the equity awarded in the CTC, and as a result to provide a simpler framework than the percentage based equity allocation rules presented above, this is in general only true under certain special circumstances to which such rules are well suited. The reason for this is that as the number of contributor equity shares outstanding increases over time, the percentage of new equity awarded, which as opposed to the absolute number of shares is the parameter of economic significance, will in general be a relatively complex declining function of time and prior contributor activity.

Figure 20A:
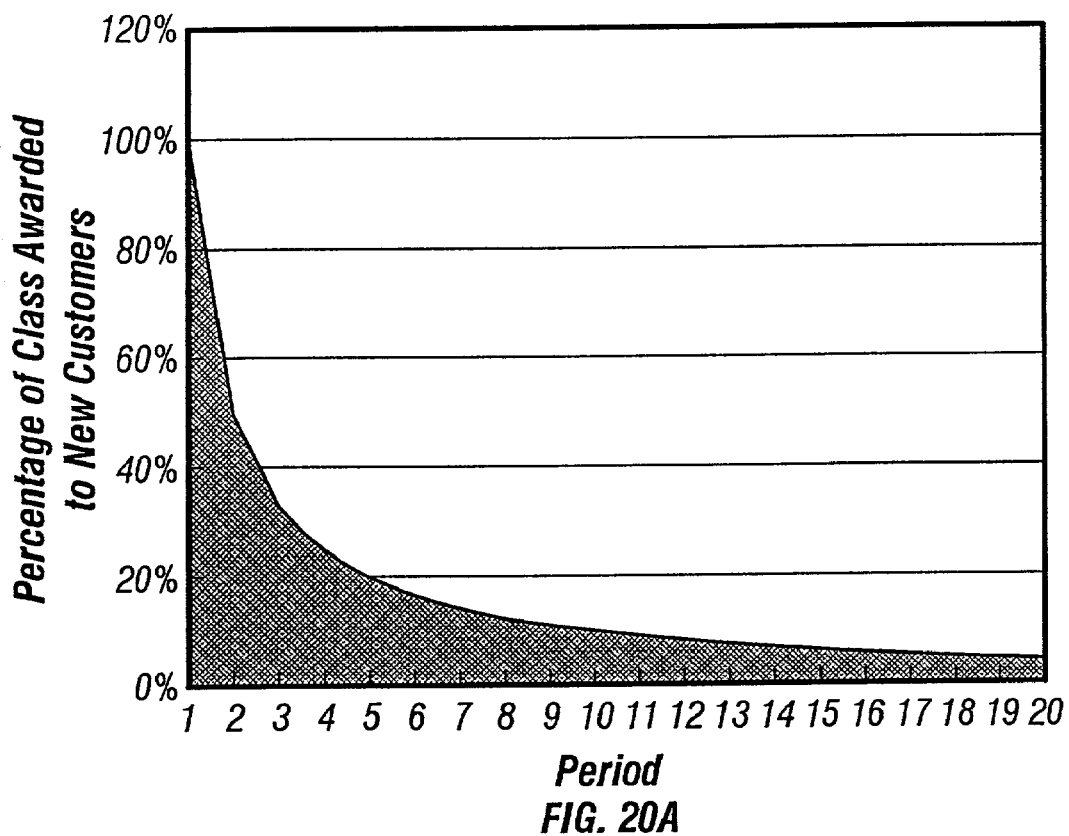
FIGS. 20A–B are graphs that show the percentage of ownership awarded to new contributors under an absolute award equity rule.
Figure 20B:
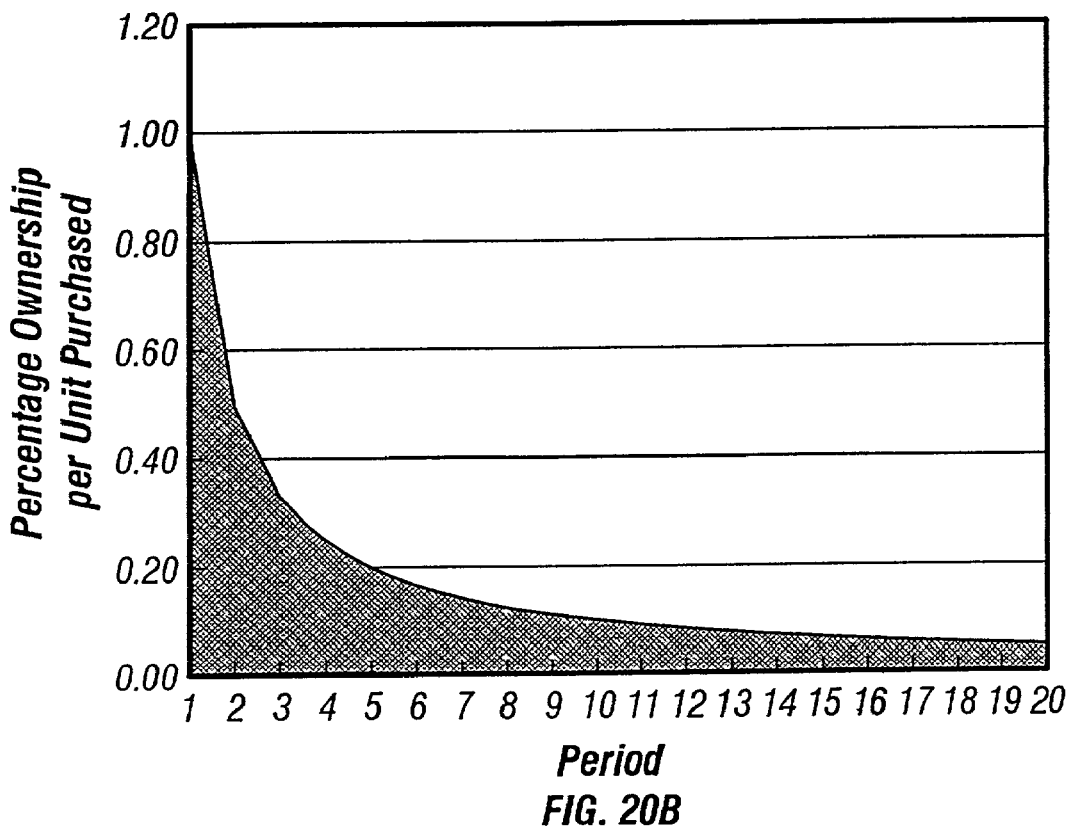

To illustrate this with a simple example, assume that Firm A has relatively stable business volumes of approximately 100 units a year. Further assume that the firm has chosen to issue one share of CTC equity for each unit of its product which it sells. Under this rule, during the first year the rule is in effect its contributors will receive 100 shares of CTC equity. This award will make up 100% of the CTC equity class, and thus equate to an award of 1% of the equity class per unit purchased. At the end of the second year a second 100 shares will be awarded to the firm's contributors during that year, causing the total number of shares in the class to increase to 200. As a result, the firm's contributors during the second year the rule is in effect will receive ownership of 50% of the equity class, or 0.5% of the class per unit purchased. Following similar logic, the percentage of the class awarded in year n will decrease to 100/n percent of the class, and the amount of ownership per unit purchased will decrease to 1/n percent of the class. These relationships are shown in FIGS. 20A–B, which show the fraction of ownership awarded to new customers under an absolute award equity rule that awards a constant number of shares for each unit purchased. The figures show that as the number of periods the rule has been in place increases the fraction of the class awarded to new contributors quickly becomes inconsequential.

Specifically, the figures show that if the aggregate contributor contribution to the firm, as measured by the firm's performance metric or metrics, is constant over time, the proposed absolute equity award results in an equity allocation identical to the one that would result from a percentage dilution equity award rule under which the percentage dilution during period n is equal to 1/n times the percentage during the first period. When the aggregate contributor contribution to the firm fluctuates over time, a now unpredictable but similarly declining schedule of effective percentage dilution rates will result.

It is also important to note that since the percentage dilution rate of the CTC equity class defines the duration of the equity awarded in the class, the declining series of percentage dilution rates generated by absolute equity award rules like the one above have an even more complex effect on the duration of the equity awarded over time. In particular, since the effective percentage dilution rate decreases over time under the absolute structure, the duration of the equity awarded will increase. To see this, note that in the example above the shares awarded during the first period are diluted during the subsequent periods at the sequence of rates (50%, 33%, 25%, 20%, . . . 1/n, . . . ). In contrast, the shares awarded during the second period are diluted with the same sequence of rates but beginning with the second term of the sequence, or (33%, 25%, 20%, . . . 1/n, . . . ). Similarly, the shares awarded during the third period are diluted with the same series but beginning with the third term, or (25%, 20%, . . . 1/n), and so on for shares awarded in subsequent periods. Thus as the percentage of the class awarded decreases toward zero the duration of the shares awarded increases toward infinity. In combination, these features give CTC equity classes awarded based on absolute equity award rules a relatively complex dynamic appropriate only under relatively specialized circumstances.

While the examples above are simplified in nature, they illustrate the principal challenge associated with using absolute equity awarded rules. As a result of these challenges, awarding an absolute amount of new equity rather than a percentage of new equity in a CTC equity class will in general substantially complicate the design, analysis and implementation of the CTC and the related DCEAS. The use of absolute equity award rules will be particularly complicated when the firm's future size, business activities and competitive position are uncertain, or if the desired performance metric or equity award rules are functions of such variables, since the number of shares outstanding in individual CTCs and the DCEAS as a whole are likely to be particularly complex to estimate under such circumstances. While it may be possible to address complications of this kind through a careful, conditional specification of the amount of equity to be awarded in each period, in most cases the desired result can be achieved more easily and accurately using a percentage equity award rule.

Joint Equity Class Size Award and Equity Allocation Rules

As mentioned above, under certain circumstances it may be desirable to jointly specify the equity class size award rule and equity allocation rule of a CTC. This is most likely to be the case when the firm wishes to closely link the size of a CTC to the nature or level of activity within it. This is often the case for the initiation period of the equity class of a CTC, as well as for the equity classes of CTCs that grow and decline in response to the growth and decline of specific types of business activities, such as product lifecycles.

To illustrate how such a rule can be structured and why it may be appropriate to the initiation of the equity class of a CTC, consider the following potential equity award rule for the CTC for the initial contributors of the firm in example 1 above: Award one share in the class for each $100 of trade conducted with the firm for the first $100,000,000 of trade conducted with the firm. Following that, award one share in the class for each $200 of trade conducted with the firm for the second $100,000,000 of trade conducted with the firm. Finally, award one share for each $500 of trade conducted with the firm for the third $100,000,000 of trade conducted with the firm. Under this rule, the size of the CTC equity class for initial contributors will grow incrementally to 1,700,000 shares over the period of time during which the firm conducts its first $300,000,000 of trade. Alternatively, the rule could be structured to award a declining percentage ownership of the firm as the firm completes its first $300,000,000 of trade, such as 0.1% for each $1,000,000 of trade for the first $100,000,000 of trade, 0.05% for each $1,000,000 of trade for the second $100,000,000 of trade, and 0.02% for each $1,000,000 of trade for the third $100,000,000 of trade.

Figure 21A:
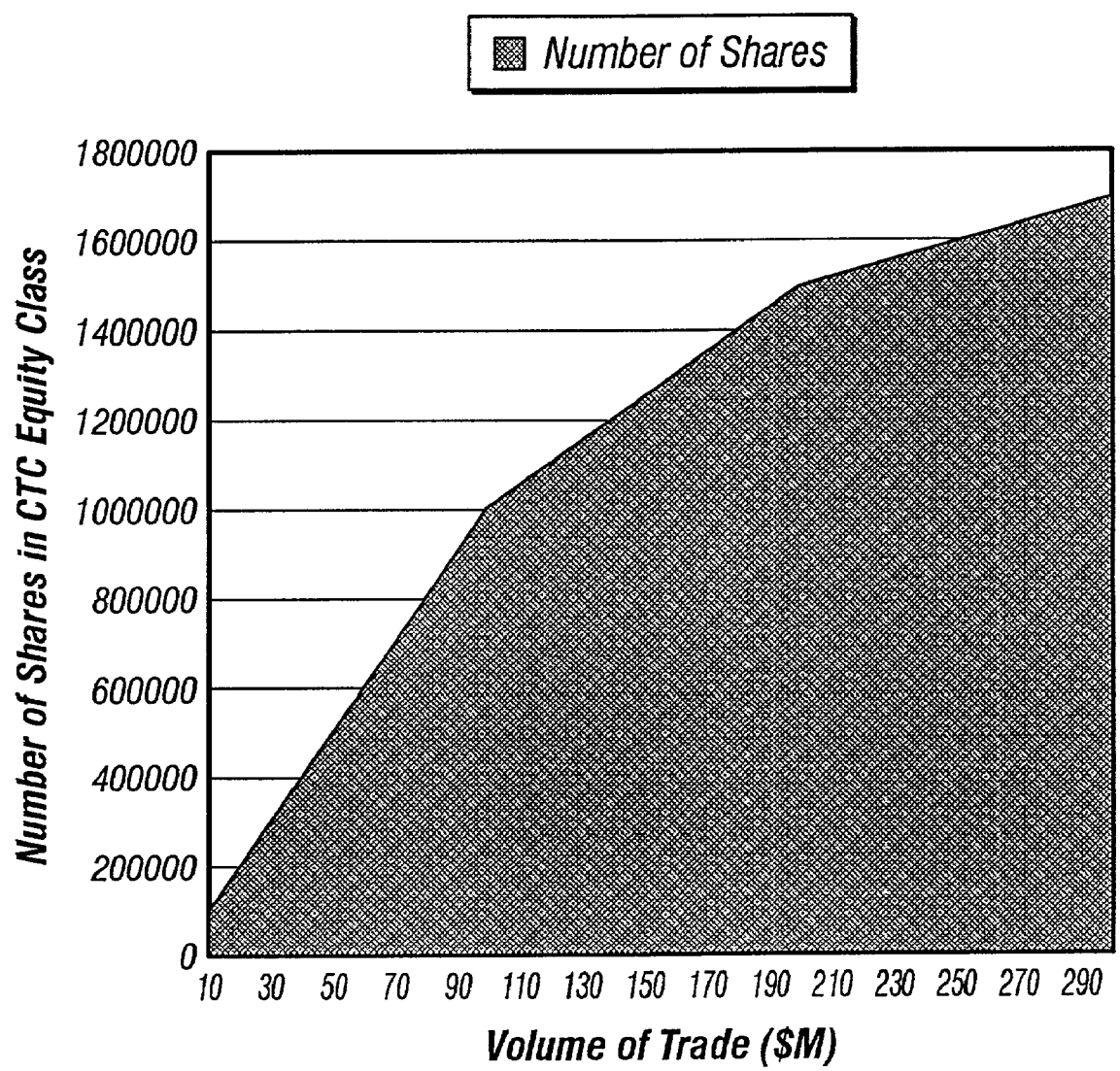
FIGS. 21A–B are graphs that show an implementation of joint equity class size award and equity allocation rules.
Figure 21B:
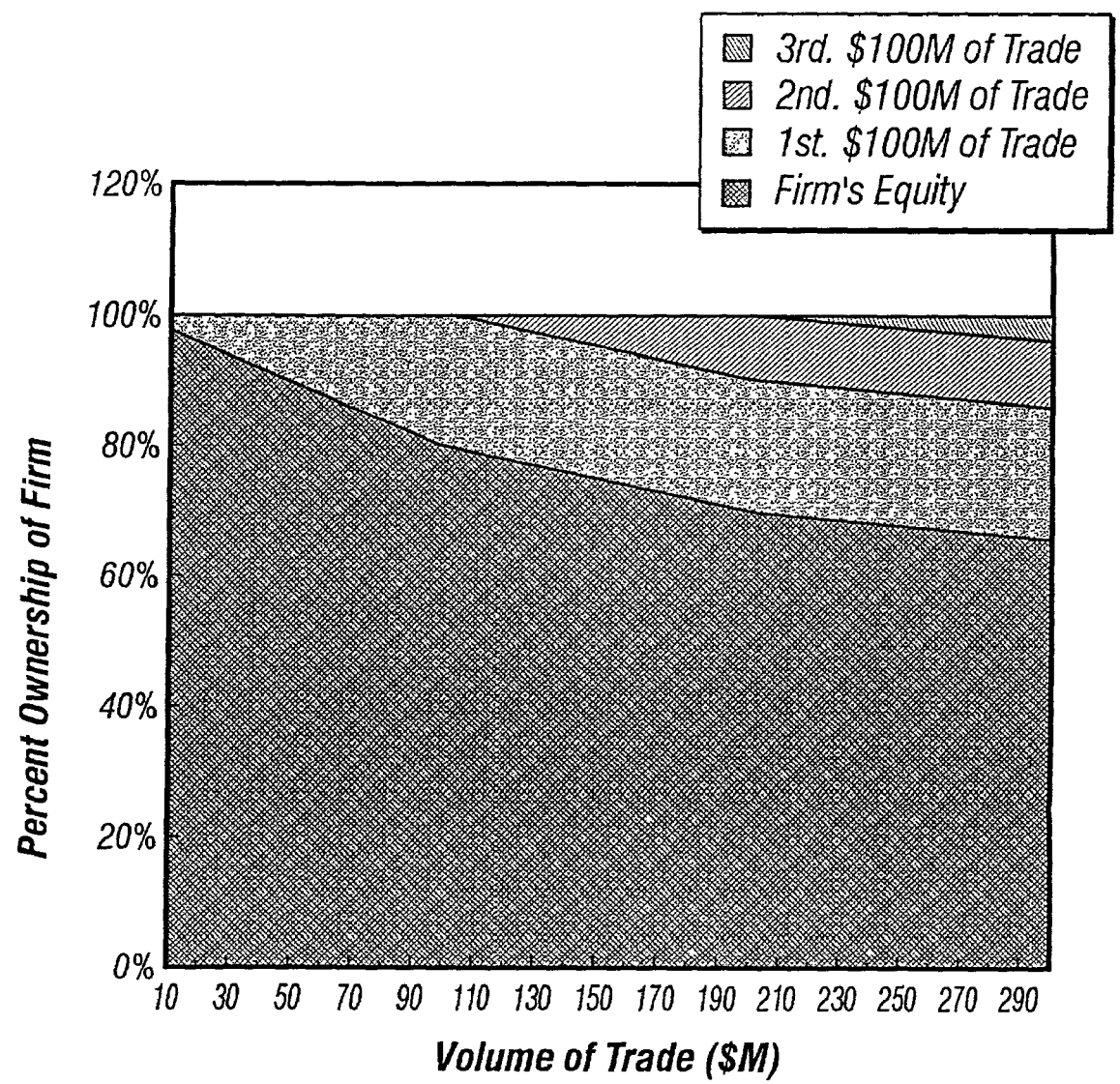

Since under either specification, the size of the class grows as new shares are awarded to contributors that complete additional trades with the firm, reallocation of the percentage ownership of the class over time will occur at the same time and by the same mechanism by which the relative size of the class is being altered. FIGS. 21A–B illustrate this combined implementation of what would have been classified above as the equity class size and equity allocation rule of the proposed equity award rule. FIGS. 21A–B show an example of joint equity class size award and equity allocation rules. The firm is assumed to have 5 million shares outstanding when establishment of class is initiated.

Specifically, the figures show how the percentage ownership of the firm evolves as the firm completes its first $300,000,000 of trades under the assumption that the firm had 5 million other shares outstanding prior to the creation of the CTC equity class.

As discussed above in the sections on performance metrics and equity class size award rules, the proposed equity award rule could be further refined by basing the number of shares awarded on the time at which certain trading volume targets are reached, such as within one month, or within three months. Similarly, it could be structured to differentiate between trades of the two types of products the firm trades, to depend on the geographic location or season in which the trades are conducted, or to be a function of other factors believed to be relevant to the value of such trades to the establishment of the firm's franchise. In addition, the firm may wish to provide disproportionate encouragement to either buyers or to sellers in its market, if one of the two is viewed as the more difficult to attract. For example, if there is a relatively small number of powerful sellers, but a large number of less powerful buyers, the firm may wish to award proportionally more equity to sellers in its market than to buyers. Similarly, it may wish to encourage market participants to offer information about the terms on which they are willing to buy or sell by awarding proportionately more equity to transaction counter parties that provide information of this kind.

While equity award rules of this kind, which allocate ownership of a CTC equity class over time in whole or in part by increasing the size of the class, work quite well in the example above where increasing the size of the class over a finite period of time seems quite appropriate, they clearly face the fundamental limitation that the size of even a single CTC equity class within a DCEAS clearly cannot continue to grow indefinitely. As a result, any such equity allocation rule can only be active for finite portion of the firm's life, and as a result can only enable the dynamic matching of contributor contributions to a firm with the value of the equity in the firm they are awarded over that period.

This is particularly important when the duration of the contribution of the relevant contributor transaction types is limited. For example, consider the two CTCs of Example 1 above, which are designed to compensate contributors that provide on-going trading volume of the two products the firm trades. Since the firm requires significant trading activity at each point in time to maintain its viability as a marketplace, contributor trading volume at each point in time makes a valuable contribution to the firm. However, the firm clearly cannot continue to award an incremental fraction of its ownership to the contributors that provide such volume indefinitely, since this would eventually consume the entire ownership of the firm. Of equal importance, the contribution to the firm made by trading volume at any given point in time is quite temporary, since it provides liquidity in the firm's market at that time only. As a result, it would also be inappropriate to award ownership in the firm with a significant duration for the provision of liquidity in the firm's market at any particular point in time, since this would generate a poor match between the characteristics of a contributor's contribution to the firm and the characteristics of the equity it is awarded for them. Thus to be both viable in the long term and to effectively match the characteristics of contributor contributions to the value of the firm to those of the equity they are awarded, an equity award rule for a CTC in which individual contributor transactions contribute to the value of the firm over a relatively short horizon, but the sequence of such transactions contribute to the firm on an on-going basis, equity with a relatively limited duration must be awarded on an on-going basis. The ability to do so is a novel benefit of the invention disclosed here.

Equity Allocation Rules For CTCs With Multiple Performance Metrics

When multiple performance metrics are used within a single CTC to reflect differences in the contribution to the value of the firm made by the different types of contributor transactions included in the CTC, it may be desirable to structure the equity allocation rule for the CTC's equity class to allocate equity to each type of contributor transaction using a different criteria. As above, the allocation of equity across contributor transaction types may be specified on either an absolute or relative basis.

For example, assume that the firm in Example 1 above believes it is appropriate to award equity with the same basic characteristics, such as duration, control rights, dividends and priority, for both of the two products it trades. As a result it has chosen to establish a single CTC for the on-going trade of the two products. Also assume, however, that trading of Product 1 is generally significantly more profitable for the firm. Given this, it has chosen to use distinct performance metrics for the two products.

In this case, the firm may choose an equity allocation rule for the CTC equity class for the two products that allocates proportionally more equity per unit of Product 1 traded than Product 2 traded. For example, the firm may choose an absolute equity allocation rule under which two-thirds of the new equity issued in the CTC equity class each period is issued to contributors that traded Product 1 during the period, and the remaining one-third to contributors that traded Product 2. Alternatively, it may chose a conditional equity award rule under which it allocates twice as much equity per unit of Product 1 traded as per unit of Product 2 traded. For instance, if the firm trades 50 units of each product in a given period and issues a total of 1,000 new shares in the CTC equity class for that period, two-thirds of those shares, or 666 shares, would be allocated to contributors that traded Product 1 that period and one-third, or 333 shares, to contributors that traded Product 2 that period. Both alternatives highlight a useful feature of combining multiple contributor transaction types in the same CTC where possible, which is the ease with which equity allocation rules for the individual contributor types included in the CTC can be specified on a relative basis.

Thus, the method of ownership interest allocation described herein may be used for dynamically determining ownership interest awards. As described above, the award recipients, which have been characterized as "contributors" to a business entity, may include business executives, employees, suppliers and other business partners and customers of the business entity. It also should be understood that the business entity and the corporation in which ownership interest awards are being determined may be different entities. This would be the case, for example, where a new corporation is being formed in part from assets of the business entity described herein. In that case, the contributions of "contributors" to the existing business entity would be determined according to the description herein, and then the award of ownership interests in the new corporation being formed would be determined according to the respective contributions to the existing business entity (or to the existing plural entities from which the new corporation might be formed). Such equity award determinations in accordance with the present invention may be particularly useful, for example, where a corporate merger or acquisition is being planned to form a new corporation, and it is desired to allocate shares in the new corporation based on a business calculation according to respective contributions to a hypothetical business entity comprising the businesses of the respective existing corporations.

The present invention has been described above in terms of a presently preferred embodiment so that an understanding of the present invention can be conveyed. There are, however, many configurations for ownership interest award techniques not specifically described herein but with which the present invention is applicable. The present invention should therefore not be seen as limited to the particular embodiments described herein, but rather, it should be understood that the present invention has wide applicability with respect to ownership interest award techniques generally. All modifications, variations, or equivalent arrangements and implementations that are within the scope of the attached claims should therefore be considered within the scope of the invention.

I claim:

1. A method of determining business entity ownership interest allocation in accordance with a digital data set, the method comprising:
   determining contributor transaction classes into which transactions of contributors with a business entity are assigned;
   processing the digital data set with a computer processor, and calculating a contribution value for the contributor transactions in each contributor transaction class to indicate the contribution of each transaction to the value of the business entity, using at least one performance metric for each contributor transaction class;
   determining at least one award rule for each contributor transaction class in response to the calculated contribution values for the contributor transaction classes;
   determining the amount of the ownership interest in the business entity to be issued to the selected contributor in accordance with the determined award rule; and
   issuing the determined ownership interest to the selected contributor.

2. A method of determining business entity ownership interest allocation in accordance with a digital data set, the method comprising:
   determining contributor transaction classes into which transactions of contributors with a business entity are assigned;
   processing the digital data set with a computer processor, and calculating a contribution value for the contributor transactions in each contributor transaction class to indicate the contribution of each transaction to the value of the business entity, using at least one performance metric for each contributor transaction class; and
   determining at least one award rule for each contributor transaction class in response to the calculated contribution values for the contributor transaction classes;
   wherein determining an award rule for a selected transaction contributor comprises:
   determining an ownership interest award rule for each contributor transaction class; and
   determining one or more rules governing changes in equity awards for contributor transaction classes over time; and
   determining an ownership interest award for each transaction contributor of the data set according to the calculated contribution value.

3. A method as defined in claims 1 or 2, wherein the at least one performance metric for a contributor transaction class is determined by:
   identifying data relevant to measurement of contributor transaction class contribution to business value;
   determining one or more performance metrics to be used for each contributor transaction class; and
   determining one or more rules for governing changes in the performance metric or metrics of each contributor transaction class over time.

4. A method as defined in claims 1 or 2, further comprising periodically re-evaluating the performance metric or metrics to be used for a contributor transaction class in response to changes in the data set over time.

5. A method as defined in claims 1 or 2, further comprising periodically re-evaluating the one or more ownership interest award rules in response to changes in the data set over time.

6. A computer system that determines a business entity ownership interest allocation, the system comprising one or more computer processors that execute program instructions and receive a digital data set, determine contributor transaction classes into which transactions of contributors with a business entity are assigned, calculate a contribution value for the contributor transactions in each contributor transaction class to indicate the contribution of each transaction to the value of the business entity, using at least one performance metric for each contributor transaction class, and determine at least one award rule for each contributor transaction class in response to the calculated contribution values for the contributor transaction classes, wherein the processors further execute program instructions to determine the amount of the ownership interest in the business entity to be issued to the selected contributor in accordance with the determined award rule and issue the determined ownership interest to the selected contributor.

7. A computer system that determines a business entity ownership interest allocation, the system comprising one or more computer processors that execute program instructions and receive a digital data set, determine contributor transaction classes into which transactions of contributors with a business entity are assigned, calculate a contribution value for the contributor transactions in each contributor transaction class to indicate the contribution of each transaction to the value of the business entity, using at least one performance metric for each contributor transaction class, and determine at least one award rule for each contributor transaction class in response to the calculated contribution values for the contributor transaction classes, wherein the processors determine an award rule for a selected transaction contributor by determining an ownership interest award rule for each contributor transaction class; determining one or more rules governing changes in equity awards for contributor transaction classes over time; and determining an ownership interest award for each transaction contributor of the data set according to the calculated contribution value.

8. A system as defined in claims 6 or 7, wherein the processors determine the at least one performance metric for a contributor transaction class by identifying data relevant to measurement of contributor transaction class contribution to business value; determining one or more performance metrics to be used for each contributor transaction class; and determining one or more rules for governing changes in the performance metric or metrics of each contributor transaction class over time.

9. A system as defined in claims 6 or 7, wherein the processors periodically re-evaluate the performance metric or metrics to be used for a contributor transaction class in response to changes in the data set over time.

10. A system as defined in claims 6 or 7, wherein the processors further periodically re-evaluate the one or more ownership interest award rules in response to changes in the data set over time.

11. A program product for use in a computer system that executes program steps recorded in a computer-readable media to perform a method for determining business entity ownership interest allocation in response to a data set, the program product comprising:
a recordable media;
a program of computer-readable instructions executable by the computer system to perform operations comprising:
determining contributor transaction classes into which transactions of contributors with a business entity are assigned;
calculating a contribution value for the grouped contributor transactions in each contributor transaction class to indicate the contribution of each transaction to the value of the business entity, using at least one performance metric for each contributor transaction class; and
determining at least one award rule for each contributor transaction class in response to the calculated contribution values for the contributor transaction classes,
wherein the operations further comprise:
determining the amount of the ownership interest in the business entity to be issued to the selected contributor in accordance with the determined award rule; and
issuing the determined ownership interest to the selected contributor.

12. A program product for use in a computer system that executes program steps recorded in a computer-readable media to perform a method for determining business entity ownership interest allocation in response to a data set, the program product comprising:
a recordable media;
a program of computer-readable instructions executable by the computer system to perform operations comprising:
determining contributor transaction classes into which transactions of contributors with a business entity are assigned;
calculating a contribution value for the grouped contributor transactions in each contributor transaction class to indicate the contribution of each transaction to the value of the business entity, using at least one performance metric for each contributor transaction class; and
determining at least one award rule for each contributor transaction class in response to the calculated contribution values for the contributor transaction classes,
wherein the operation of determining an award rule for a selected transaction contributor comprises:
determining an ownership interest award rule for each contributor transaction class; and
determining one or more rules governing changes in equity awards for contributor transaction classes over time; and
determining an ownership interest award for each transaction contributor of the data set according to the calculated contribution value.

13. A program product as defined in claims 11 or 12, wherein the at least one performance metric for a contributor transaction class is determined by:
identifying data relevant to measurement of contributor transaction class contribution to business value;
determining one or more performance metrics to be used for each contributor transaction class; and
determining one or more rules for governing changes in the performance metric or metrics of each contributor transaction class over time.

14. A program product as defined in claims 11 or 12, further comprising periodically re-evaluating the performance metric or metrics to be used for a contributor transaction class in response to changes in the data set over time.

15. A program product as defined in claims 11 or 12, further comprising periodically re-evaluating the one or more ownership interest award rules in response to changes in the data set over time.

* * * * *